(12) United States Patent
Tamai et al.

(10) Patent No.: US 7,630,642 B2
(45) Date of Patent: Dec. 8, 2009

(54) RANGING METHOD FOR COMMUNICATION SYSTEM BETWEEN OPTICAL LINE TERMINAL AND PLURALITY OF OPTICAL NETWORK UNITS

(75) Inventors: Hideaki Tamai, Kanagawa (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 509 days.

(21) Appl. No.: 11/653,351

(22) Filed: Jan. 16, 2007

(65) Prior Publication Data

US 2007/0196108 A1  Aug. 23, 2007

(30) Foreign Application Priority Data

Feb. 22, 2006  (JP) .............................. 2006-045090

(51) Int. Cl.
*H04J 14/00* (2006.01)
(52) U.S. Cl. .............................. 398/77; 398/66; 398/78; 398/76; 398/75
(58) Field of Classification Search ............. 398/75–78, 398/66
See application file for complete search history.

(56) References Cited

U.S. PATENT DOCUMENTS

| | | | | |
|---|---|---|---|---|
| 7,280,764 | B2 * | 10/2007 | Nishimura et al. ........... | 398/152 |
| 2004/0202202 | A1 * | 10/2004 | Kolze et al. .................. | 370/503 |
| 2006/0056461 | A1 * | 3/2006 | Currivan et al. ............. | 370/503 |
| 2006/0115272 | A1 * | 6/2006 | Minato et al. ................ | 398/77 |

FOREIGN PATENT DOCUMENTS

| | | |
|---|---|---|
| JP | 10-093607 | 4/1998 |
| WO | WO-96/13915 | 5/1996 |

OTHER PUBLICATIONS

"Ethernet PON System", Hiroya Ohnishi et al., Fujikura Giho No. 102, Apr. 2002, pp. 18-21.
"PON Based All Fiber-Optic Access System", Yoshio Miyamori et al., Hitachi Review, vol. 47, No. 2, 1998, pp. 63-66.

* cited by examiner

*Primary Examiner*—Ken N Vanderpuye
*Assistant Examiner*—Hibret A Woldekidan
(74) *Attorney, Agent, or Firm*—Venable LLP; James R. Burdett

(57) ABSTRACT

In 1 to N communication based on code division multiplexing, ranging is performed by following the first to ninth steps. First step: all the optical network units are set to standby status. Second step: first and second optical network units are set to transmission enable status. Third step: the phase shift amount is set for the variable phase shifters of the first and second optical network units. Fourth step: reception of a fixed signal is attempted in the optical line terminal. Fifth step: if the fixed signal is not received, processing returns to the second step, and if received, the phase amount of the variable phase shifter is defined and fixed. In the sixth to ninth steps, an operation the same as the first to fifth steps is performed for the third to N-th optical network units. In these steps, the optical line terminal receives the i-th reply signal (i is an integer in the 1 to (n−1) range and i≠n) sent from at least one i-th optical network unit out of the first to (n−1)th optical network units, and sequentially defines and fixes the phase shift amount of the variable phase shifter of the third to N-th optical network units.

2 Claims, 16 Drawing Sheets

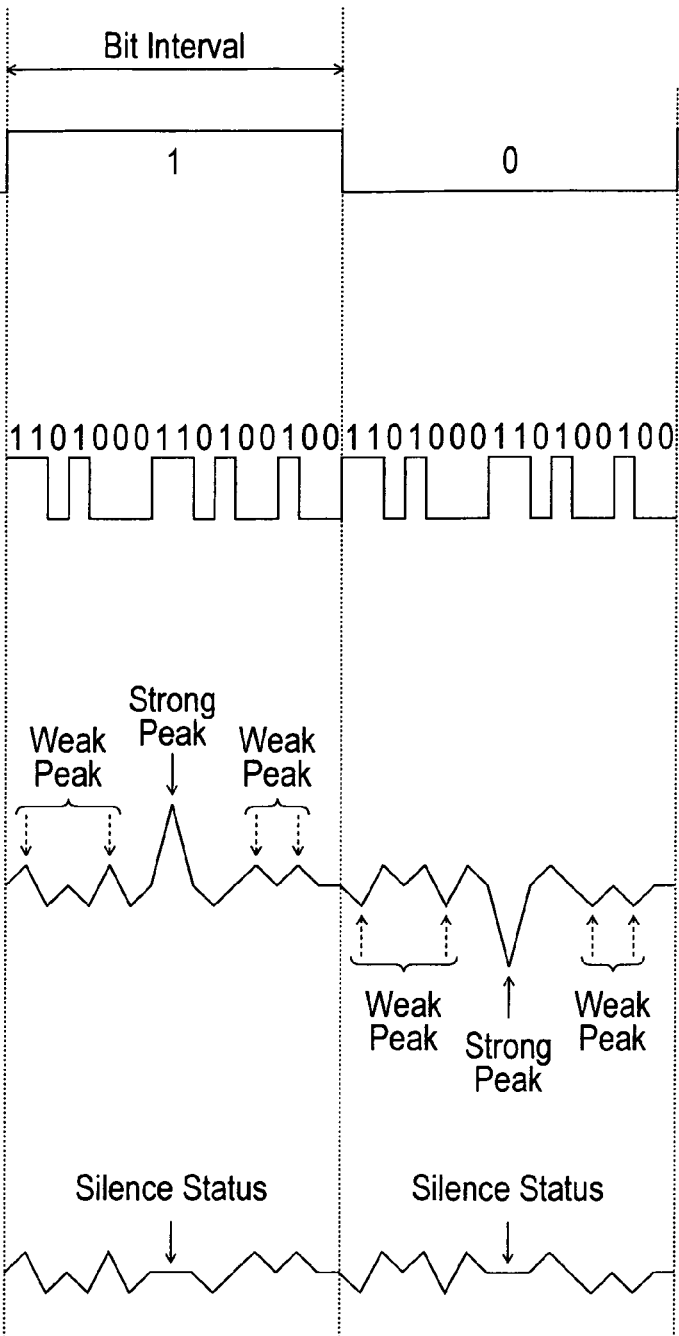
FIG. 7A — Transmission Signal
FIG. 7B — Diffusion Signal
FIG. 7C — Matched Filter Output (Auto-Correlation, Time Series Indication)
FIG. 7D — Matched Filter Output (Cross-Correlation, Time Series Indication)

RANGING METHOD FOR COMMUNICATION SYSTEM BETWEEN OPTICAL LINE TERMINAL AND PLURALITY OF OPTICAL NETWORK UNITS

BACKGROUND OF THE INVENTION

1. Field of the Invention

The present invention relates to a ranging method in an access network system for an optical line terminal and a plurality of optical network units to communicate using a code division multiplexing (CDM) method, for adjusting the receive timing of a signal corresponding to delay time based on the difference of distance from the optical line terminal to each optical network unit.

2. Description of Related Art

As a typical example of a communication system between an optical line terminal and a plurality of optical network units, an optical access network system constructed by connecting the optical line terminal and a plurality of optical network units via PON (Passive Optical Network) is receiving attention. The optical line terminal is an equipment installed at a service provider side, and may be called a "center node" or a "service node". The optical network unit is an equipment installed at a subscriber (may also be called "user") side, and may be called an "edge node".

PON is a network for connecting an optical splitter in the middle of an optical fiber transmission line so as to split one optical fiber transmission line into a plurality of optical fiber transmission lines, and connecting a plurality of edge nodes in a star shape with this optical splitter at the center (e.g. see Hiroya Ohnishi et al: "Ethernet PON System", Fujikura Giho No. 102, April 2002, pp. 18-21, and Yoshio Miyamori et al: "PON Based All Fiber-Optic Access System", Hitachi Review, Vol. 47, NO. 2, 1998, pp. 63-66). By using PON for a network connecting the center node and edge nodes, the optical fiber transmission line between the center node and the optical splitter can be shared by a plurality of edge nodes, and equipment cost can be suppressed.

Hereafter communication between the center node and the N number of edge nodes may be called "1 to N communication" (here N is 2 or higher integer).

An example of a conventional optical access network system using PON involves identifying a transmission signal from each user by controlling the time slot of the TDM (Time Division Multiplexing) signal using the TDM method (e.g. see Japanese Patent Application Laid-Open No. H10-93607 and Japanese Patent Application Laid-Open No. H10-508443 (corresponding to WO 96/13915)). According to this example, a method of adjusting a signal receive timing corresponding to the delay time based on the difference of distance from the center node to each edge node (hereafter may be called "ranging method") has already been known. In other words, in the 1 to N communication using the TDM method, the ranging method has already been disclosed.

On the other hand, if the CDM method could be used for an optical access network system using PON, various advantages, inherent to the CDM method, could be utilized.

The CDM method is a communication method of encoding and transmitting transmission signals and decoding them at the receive side using the same codes used for encoding at the transmission side. The communication method based on CDM has the following advantages. First, the communication method based on CDM is a method in which the transmission side and the receive side use the same codes as keys (codes which are set in the encoder and decoder may be called keys), so security during communication is high. Also according to CDM, it is possible to multiplex a plurality of transmission signals at the same time, so large capacity data communication is possible while conserving communication resources, such as wavelengths and time slots.

This invention is a technology which can be applied not only to an optical access network system which uses a PON type communication network, but can be widely applied to an access network which executes all the operations based on electric signals alone, without involving optical signals. However, in the following description, the optical access system which uses PON, in particular, may be described for convenience. In this case, the optical line terminal, that is a center node, may be called "OLT (Optical Line Terminal)", and an optical network unit, that is an edge node, may be called an "ONU (Optical Network Unit)".

As described above, if the CDM method could be used for 1 to N communication using PON, superb features of the CDM method could be utilized. When the 1 to N communication system is constructed by the CDM method, ranging, to adjust the delay time based on the respective difference of distance from the center node to each node, must be performed. However, in the 1 to N communication system based on CDM, a method for performing ranging has not been established.

With the foregoing in view, it is an object of the present invention to provide a ranging method in the case of using the CDM method for the 1 to N communication system.

SUMMARY OF THE INVENTION

A ranging method of the first invention is a method applied to an access network system which performs 1 to N communication based on CDM. The access network system to perform 1 to N communication comprises an optical line terminal connected to one end of a common transmission line, of which installed at the other end is a distributor/multiplexer, and first to N-th optical network units which are connected respectively to N number of split transmission lines formed by being split by the distributor/multiplexer. The distributor/multiplexer has a function to split one input signal into N and output the signals, or to multiplex N number of input signals into one signal and output the signal.

To solve the above problems, the ranging method of the first invention comprises the following first to ninth steps.

(1) A step of sending a transmission stop instruction from the optical line terminal to all of the first to N-th optical network units respectively, so as to set all of the first to N-th optical network units to standby status (first step);

(2) a step of sending a first and second transmission enable signals from the optical line terminal to the first and second optical network units respectively (second step);

(3) a step of, in the first and second optical network units, reading first and second phase shift information provided by first and second control signals for the first and second optical network units included in the first and second transmission enable signals, setting first and second phase shift amounts according to the first and second phase shift information respectively for first and second variable phase shifters of the first and second optical network units respectively, and simultaneously sending a first and second reply signals from the first and second optical network units to the optical line terminal respectively (third step);

(4) a step of, in a first receive section and a second receive section of the optical line terminals corresponding to the first and second optical network units, attempting simultaneous receive of a first and second fixed signals included in the first and second reply signals (fourth step);

(5) a step in which if the first and second fixed signals cannot be received in the fourth step, processing returns to the second step, and the optical line terminal sends an instruction to the first optical network unit and/or the second optical network unit to set a phase shift amount different from the first and second phase shift amounts which have been set in the third step, and if the first and second fixed signals can be received, the optical line terminal sends first and second receive synchronization completion notice signals to the first and second optical network units respectively, and the first and second phase shift amounts are defined and fixed as the phase shift amounts of the first and second variable phase shifters of the first and second optical network units respectively (fifth step);

(6) a step of, from the optical line terminal, sending an n-th (n is an integer in the 3 to N range) transmission enable signal to an n-th optical network unit (sixth step);

(7) a step of, in the n-th optical network unit, reading the n-th phase shift information provided by an n-th control signal included in the n-th transmission enable signal, setting the n-th phase shift amount according to the n-th phase shift information for an n-th variable phase shifter of the n-th optical network unit, and sending an n-th reply signal to the optical line terminal (seventh step);

(8) a step of, in an n-th receive section of the optical line terminal corresponding to the n-th optical network unit, attempting to receive an n-th fixed signal included in the n-th reply signal sent from the n-th optical network unit (eighth step); and (9) a step in which if the n-th fixed signal cannot be received in the eighth step, processing returns to the sixth step and the optical line terminal sends an instruction to the n-th optical network unit to set a phase shift amount different from the n-th phase shift amount which has been set in the seventh step, and if the n-th fixed signal can be received, the optical line terminal sends an n-th receive synchronization completion notice signal to the n-th optical network unit, and the n-th phase shift amount is defined and fixed as the n-th phase shift amount of the n-th variable phase shifter of the n-th optical network unit (ninth step).

From the sixth step to the ninth step, the optical line terminal receives an i-th reply signal (i is an integer in a 1 to (n−1) range and i≠n) which is sent from at least one i-th optical network unit out of the first to (n−1)th optical network units, executes processing sequentially from the case of n=3 to the case of n=N, and processing ends when the sixth step to the ninth step for n=N are executed.

The ranging method of the second invention is different from the above mentioned ranging method of the first invention in the fifth step. The fifth step of the ranging method of the second invention is a step with the following contents. In other words, if the first and second fixed signals cannot be received in the fourth step, processing returns to the second step, and either the phase shift amount of the variable phase shifter of the optical line terminal for adjusting the phase of a master clock signal is changed and/or the optical line terminal sends an instruction to the second optical network unit to set a phase shift amount different from the second phase shift amount which was set in the third step.

If the first and second fixed signals can be received, the optical line terminal sends a second receive synchronization completion notice to the second optical network unit, and a phase shift amount of the variable phase shifter of the optical line terminal and the second phase shift amount are defined and fixed as the phase shift amount of the variable phase shifter of the optical line terminal and the phase shift amount of the second variable phase shifter of the second optical network unit respectively.

The first and second ranging method of this invention is a method of performing ranging for the first and second optical network units from the second step to the fifth step, but the ranging may be performed for k number of (k is an integer in the 3 to N range) optical network units. To perform ranging with this method, a step of sending the (k+1)th (k is an integer in the 3 to N range) transmission enable signal to the (k+1)th optical network unit from the optical line terminal in the sixth step. However even if the first and second ranging methods are written here, they are still the same in terms of performing ranging for the first and second optical network units first, then a step of performing ranging for the third optical network unit is taken, so the first and second ranging methods substantially have the same technical contents, and the difference is merely a difference of expression of the invention.

According to the ranging method of the first invention, all the optical network units enter standby status by execution of the first step. In this status, all the optical network units can receive the signals sent from the optical line terminal, but cannot send the signals to the optical line terminal. When the first and second transmission enable signals are sent from the optical line terminal to the first and second optical network units respectively (second step is executed) in this status, only the two optical network units, that is the first and second optical network units, can transmit signals. In other words, only these two optical network units can send signals to the optical line terminal.

The first and second transmission enable signals include the first and second phase shift information. In the third step, the first and second phase shift amounts, as the initial values, are set in the first and second variable phase shifters of the first and second optical network units respectively according to this phase shift information. In this status, the first and second fixed signals are simultaneously sent from the first and second optical network units to the optical line terminal, and it is judged whether these fixed signals are received by the optical line terminal (fourth step).

If the ranging is performed correctly for the first and second optical network units, these fixed signals are received by the optical line terminal. In other words, this means that the first and second phase shift amounts, which are set at this time, are the optimum values for adjusting the receive timing correctly. With this, the ranging operation for the first and second optical network units ends.

If the fixed signals are not received in the fourth step, on the other hand, this means that the ranging was not performed correctly. In this case, processing returns to the second step, and each step up to the fourth step is repeatedly executed until the ranging is finally performed correctly. By this repeat execution, the first and second phase shift amounts are changed until ranging is performed correctly, and finally the optimum values are set (fifth step). In other words, in the fifth step, the ranging operation for the first and second optical network units ends.

The contents in the sixth step to the ninth step are the same as the above mentioned second step to the fifth step respectively. Therefore in the sixth to ninth steps, the ranging operation for the third to the N-th optical network units is executed. In this way, in the first step to the ninth step, ranging for all the optical network units completes.

The first characteristic of the ranging method of the first invention is that the optical line terminal always executes ranging while simultaneously receiving fixed signals which are sent from a plurality of optical network units. In other words, in the third step, the first and second reply signals, including the first and second fixed signals, are simultaneously sent from the first and second optical network units to the optical line terminal respectively, and in the fourth step, simultaneous reception of the first and second fixed signals is attempted. In the sixth to ninth steps, simultaneous reception of the reply signal, from at least one optical network unit out of the first to the (n−1)th optical network units to the optical line terminal and the fixed signal from the n-th optical network unit, is attempted.

By this first characteristic, the weak peak of the auto-correlation signal, which is acquired by decoding the receive signal, is flattened and disappears by the cross-correlation signal of the receive signal from another optical network unit which is received simultaneously, so the signal can always be latched by the strong peak of the auto-correlation signal. Therefore it can be judged with certainty whether the fixed signal is received by the optical line terminal or not.

The second characteristic of the ranging method of the first invention is that the phase shift information is always sent from the optical line terminal to each optical network unit. This means that the ranging is executed by adjusting the phase shift amount which is set in the variable phase shifter of each optical network unit, and the variable phase shifter for adjusting the phase of the master clock signal, which is generated in the optical line terminal, is not required. In other words, in the ranging method of the first invention, the ranging is executed using the master clock signal which is generated in the optical line terminal as a reference.

Also according to the ranging method of the second invention, the fifth step, which is different from that of the ranging method of the first invention, is executed. In other words, in the fifth step, a processing for changing the phase shift amount of the variable phase shifter of the optical line terminal is executed for adjusting the phase of the master clock signal. Or the optical line terminal does not send any instruction to the first optical network unit, but sends an instruction to set a phase shift amount different from the second phase shift amount which was set in the third step to the second optical network unit.

This means that the phase of the master clock signal is adjusted, or the phase shift amount to be set in the second variable phase shifter of the second optical network unit is adjusted. In other words, in the ranging method of the second invention, the ranging is executed using the phase shift amount to be set in the first variable phase shifter of the first optical network unit as a reference. Therefore according to the ranging method of the second invention, the phase shift adjustment for ranging can be performed at the optical line terminal side by adjusting the phase shift amount of the variable phase shifter of the optical line terminal, so adjustment is easier compared with setting the first variable phase shifter of the first optical network unit by the remote operation from the optical line terminal.

As mentioned above, the ranging methods of the first and second invention have different advantages respectively, such as not requiring a variable phase shifter for adjusting the phase of the master clock signals to be generated in the optical line terminal, or making adjustment easier compared with setting the first variable phase shifter of the first optical network unit by remote operation from the optical line terminal.

BRIEF DESCRIPTION OF THE DRAWINGS

The foregoing and other objects, features and advantages of the present invention will be better understood from the following description taken in connection with the accompanying drawings, in which:

FIGS. 7A, 7B, 7C and 7D are diagrams depicting the waveform in the time domain of a transmission signal, diffusion signal, auto-correlation and cross-correlation;

DESCRIPTION OF THE PREFERRED EMBODIMENTS

Embodiments of the present invention will now be described with reference to the drawings. Each drawing shows one configuration example according to the present invention, which roughly indicates the positional relationship between each composing element and other matters merely to assist in understanding the present invention, and therefore is not for limiting the present invention to an illustrated example. Also in the following description, specific elements and conditions may be used, but these elements and conditions are just one of the preferred embodiments, and the present invention is therefore not limited to these embodiments and conditions. Composing elements the same in each drawing are denoted with the same reference numbers, and redundant description thereof may be omitted.

<Access Network System>

To describe the ranging method of the first and second inventions, the configuration and operation of the access network system to which this method is applied will be described first with reference to FIG. 1 to FIG. 4. Hereafter a ranging method common to both the first and second inventions may simply be called a "method of this invention".

Figure 1:
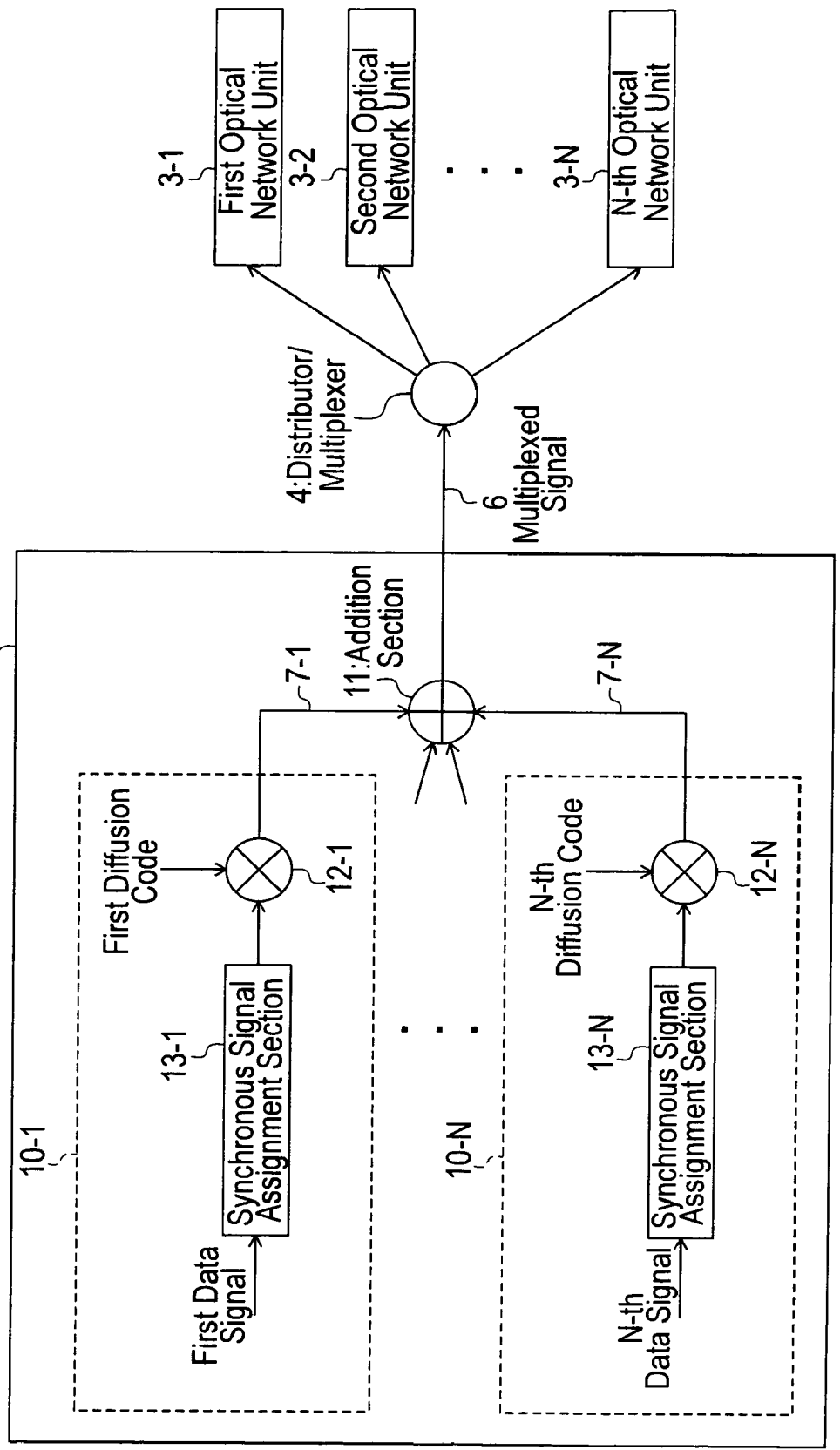
FIG. 1 is a block diagram depicting the access network system for explaining the flow of a transmission signal from the optical line terminal to the optical network units.

FIG. 1 is a block diagram depicting the access network system for explaining the flow of a transmission signal from the optical line terminal 2 to the optical network units 3. The optical line terminal 2 and the optical network units 3 (3-1 and 3-N) can perform N channels of communication via a common transmission line 6 and split transmission lines 7 (split transmission lines 7-1 to 7-N in the case of FIG. 1). The optical line terminal 2 has N channels of transmission sections 10 (10-1 to 10-N) and one addition section 11.

Hereafter when it is necessary to identify the channel of a device concerning a device of each channel, the channel number is added after the main number to indicate the device. For example, the transmission sections of the optical line terminal corresponding to the first channel to the N-th channel are denoted as the first transmission section 10-1 to the N-th transmission section 10-N respectively. If it is necessary to identify the channel of a device, only the main number of the device is used. For example, to generically refer to the first transmission section 10-1 to the N-th transmission section 10-N, simply "transmission section 10" is used.

The composing portion of the optical line terminal 2 shown in FIG. 1 is only the portion of the optical line terminal 2 related to transmission. In other words, the first transmission section 10-1 and the N-th transmission section 10-N of the optical line terminal 2 are shown. The first to N-th transmission sections all have identical configuration.

The method of this invention is a method to be applied to an access network system which performs 1 to N communication based on CDM. This system is comprised of an optical line terminal 2 connected to one end of a common transmission line 6, of which installed at the other end is a distributor/multiplexer 4, and a first to N-th optical network units, which are connected to N number of split transmission lines (split transmission lines 7-1 to 7-N) respectively, which are split by the distributor/multiplexer 4.

The N number of optical network units from the first to N-th optical network units means the first optical network unit 3-1 to the N-th optical network unit 3-N. In FIG. 1, the second optical network unit 3-2 to the (N−1)th optical network unit 3-(N−1) are omitted. The first to the N-th optical network units all have an identical structure. Therefore hereafter the optical network unit will be described without making any distinction among the first to N-th optical network units.

The distributor/multiplexer 4 has a function to split one input signal into N and output the signals, or to multiplex N number of input signals into one signal and output the signal.

The transmission section 10 has a synchronous signal assignment section 13 for assigning a synchronous signal to the data signal of each channel, and an encoding section 12 for encoding the data signal. The encoded transmission signal which is output from the transmission section 10 of each channel (may also be called an "encoded transmission signal") is multiplexed by the addition section 11 and output to the common transmission line 6. Hereafter the signal generated by multiplexing the encoded transmission signal may be called a "code division multiplexed signal".

When a PON system, where the common transmission line 6 is implemented by an optical fiber, is used, the encoded transmission signal which is output from the transmission section 10 is converted into an optical signal, then is multiplexed and output to the common transmission line 6. The method of this invention can be used regardless whether communication is performed between the optical line terminal 2 and optical network unit 3 via optical signals or via original electric signals. Therefore hereafter it is not mentioned whether the communication between the optical line terminal 2 and the optical network unit 3 is performed via optical signals or not.

The code division multiplexed signal which is sent from the optical line terminal 2 to the optical network unit 3 is divided into N by the distributor/multiplexer 4, and divided signals are input to the first optical network unit 3-1 to the N-th optical network unit 3-N respectively. A channel number is assigned to each of the optical network units 3. For example, the first to the N-th channels are assigned to the first optical network unit 3-1 to the N-th optical network unit 3-N respectively.

In the optical line terminal 2, a transmission section 10 is installed for each corresponding channel. In other words, for each of the first to the N-th channel, the first transmission section 10-1 to the N-th transmission section 10-N are installed respectively. The encoded transmission signal which is sent from the transmission section 10 is decoded and received by the receive section of each of the optical network units 3. The configuration of the receive section of an optical network unit 3 will now be described.

Figure 2:
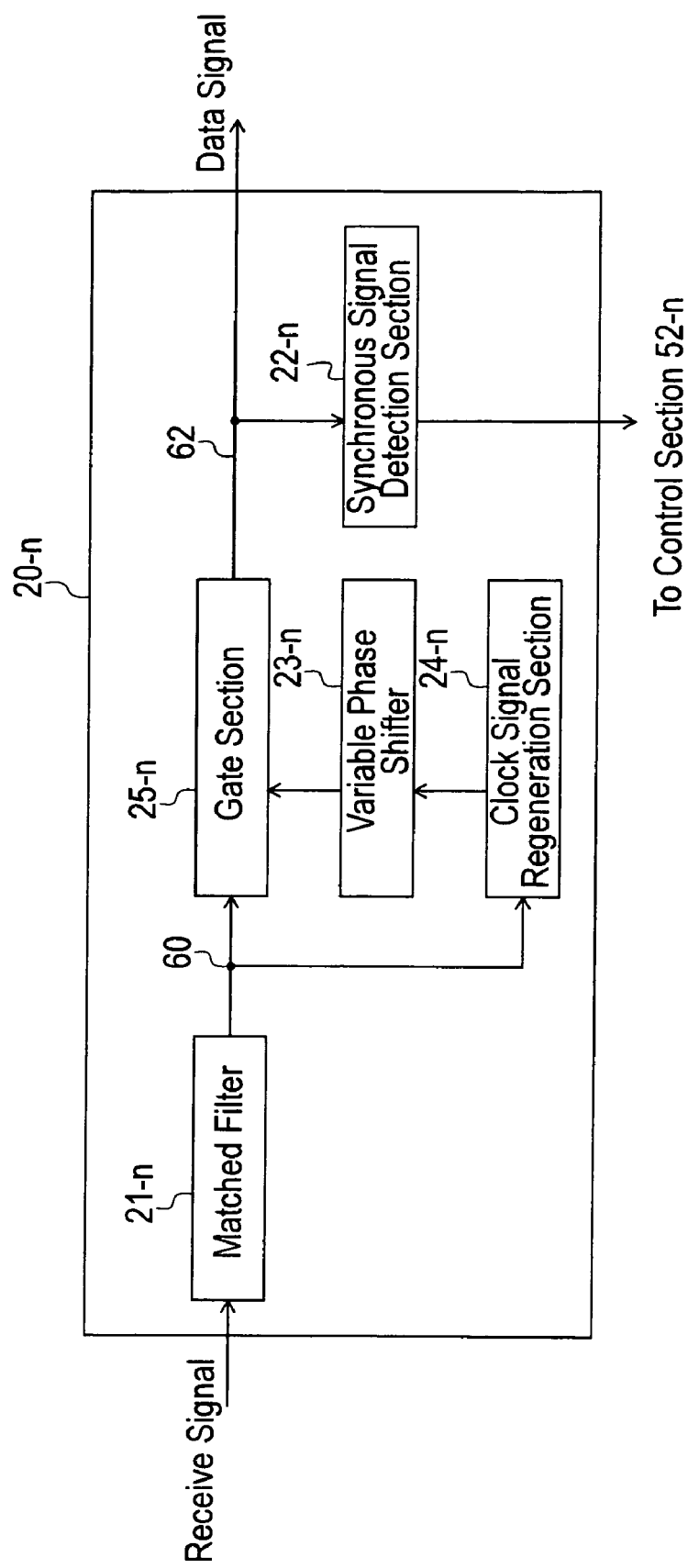
FIG. 2 is a block diagram depicting the optical network unit.

The configuration of the receive section 20 of the optical network unit 3 will be described with reference to FIG. 2. FIG. 2 is a block diagram depicting the optical network unit 3. The receive section 20 is comprised of a matched filter 21, clock signal regeneration section 24, variable phase shifter 23, gate section 25 and synchronous signal detection section 22.

The matched filter 21 regenerates the correlation output signal from the code division multiplexed signal, and outputs it. This correlation output signal is split by the splitter 60, and one of the split signals is input to the clock signal regeneration section 24. The other signals split by the splitter 60 are input to the gate section 25. The clock signal regeneration section 24 generates the regenerated clock signal from the correlation output signal split by the splitter 60, and outputs it. The variable phase shifter 23 changes the phase of the regenerated clock signal, and outputs it. The gate section 25 latches the correlation output signal, which is output from the matched filter 21 and is split by the splitter 60, by the regenerated clock signal, which is output from the variable phase shifter 23, and outputs it. The synchronous signal detection section 22 detects a synchronous signal from the signals after the splitter 62 splits the output signal which is output from the gate section 25, and outputs this synchronous signal to the later mentioned control section.

The regenerated clock signal generated by the clock signal regeneration section 24 is not only used as the above mentioned latch signal, but is also used for transmission processing, which is executed by the transmission section 30 of the optical network unit 3. The configuration of the transmission section 30 of the optical network unit 3 will now be described with reference to FIG. 3.

Here transmission processing means the processing for encoding a transmission signal by assigning a synchronous signal to a signal which is sent from the optical network unit 3 to the optical line terminal 2. The synchronous code assignment and encoding processing are performed using a known device, such as a central processing unit (CPU). For the clock signal for driving the CPU (not illustrated) which controls the processing, the regenerated clock signal generated by the clock signal regeneration section 24 is used.

Figure 3:
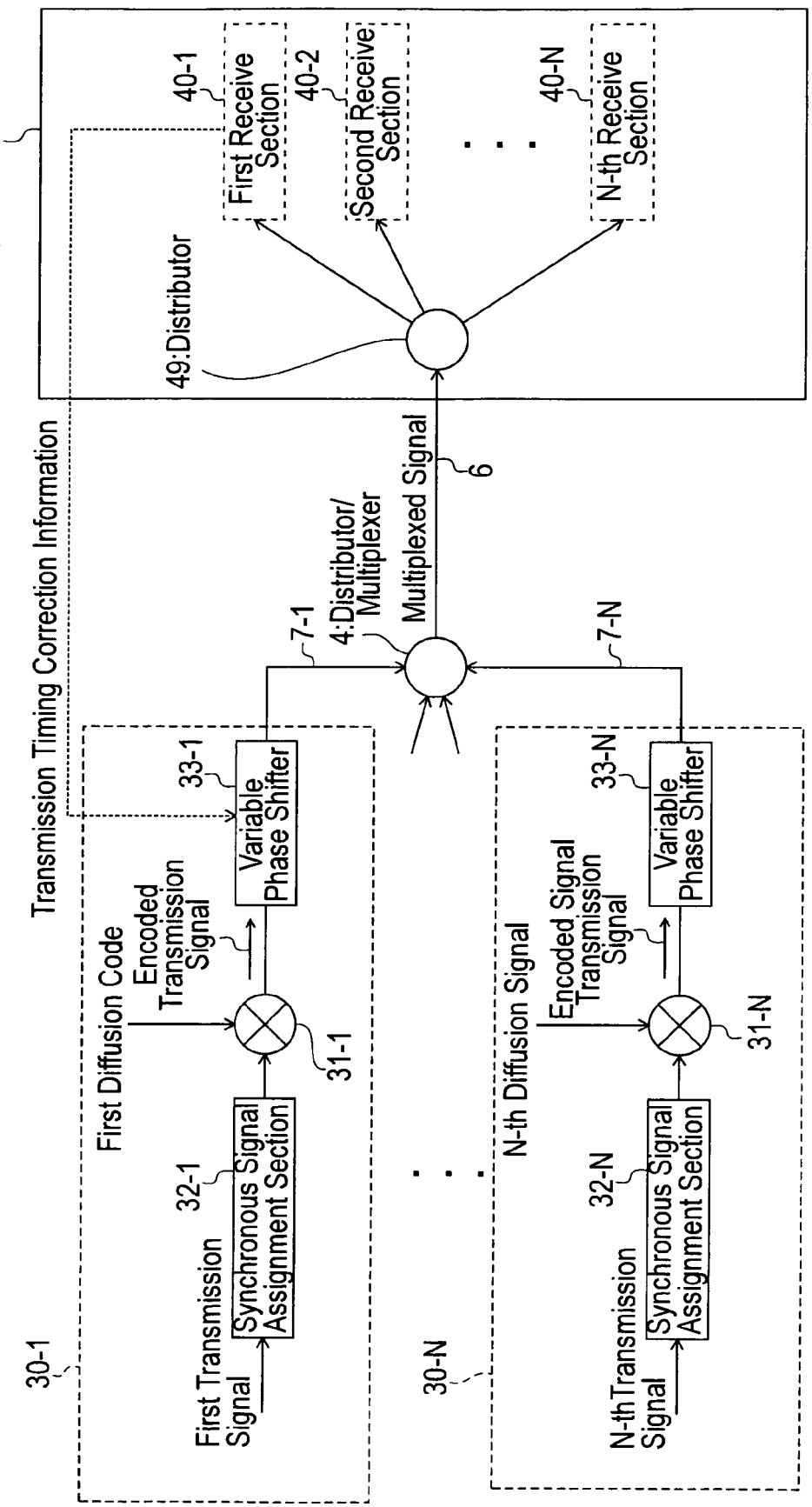
FIG. 3 is a block diagram depicting the access network system for explaining the flow of a transmission signal from the optical network units to the optical line terminal.

The configuration of the optical network unit 3 will now be described with reference to FIG. 3. FIG. 3 is a block diagram depicting the access network system for explaining the flow of the transmission signal from the optical network unit 3 to the optical line terminal 2, and particularly for explaining the configuration of the optical network unit 3. The composing portion of the optical network unit 3 shown in FIG. 3 is only the transmission section 30 of the optical network unit 3 for simplification. In other words, the first transmission section 30-1 of the first optical network unit 3-1 and the N-th transmission section 30-N of the N-th optical network unit 3-N are shown as representatives. The first to the N-th transmission sections all have an identical configuration.

The transmission section 30 has an encoding section 31, synchronous signal assignment section 32 and variable phase shifter 33. The encoding section 31 encodes the data signal, which is formed by synchronizing the regenerated clock signal, using the code assigned to each channel, to generate the encoded transmission signal, and outputs the encoded transmission signal. A diffusion code assigned to each channel is input to the encoding section 31. For example, the first diffusion code is input to the encoding section 31-1 of the first channel. Here the data signal means a signal having information to be transmitted, and when the data signal is transmitted, a later mentioned synchronous signal is added to the data signal, and the signal generated like this is sent as the transmission signal. The synchronous signal assignment section 32 adds the synchronous signal to the data signal to generate a transmission signal, and outputs it. The variable phase shifter 33 adjusts the transmission timing of the transmission signal. In other words, the encoded transmission signal is input to the variable phase shifter 33, and a delay required for adjusting the transmission timing is added to the encoded transmission signal which was input, and the encoded transmission signal is output.

In FIG. 3, the broken line shows how the transmission timing correction information is sent from the first receive section 40-1 of the optical line terminal 2 to the variable phase shifter 33-1 of the first optical network unit 30-1, using the first channel as an example, in order to conceptually show the transmission of the correction information of the transmission timing from the optical line terminal 2 to the variable phase shifter 33, as described later.

The encoded transmission signal to be sent from the optical network unit 3 is multiplexed by the distributor/multiplexer 4, propagates through the common transmission line 6 as the code division multiplexed signal, and is transferred to the optical line terminal 2. The code division multiplexed signal is divided into N by the distributor 49 in the optical line terminal 2, and the signals are input to the receive sections 40 of the optical line terminal 2. The receive sections 40 are N number of receive sections, that is the first receive section 40-1 to the N-th receive section 40-N, and the first to N-th channels are assigned to the receive sections respectively.

Figure 4:
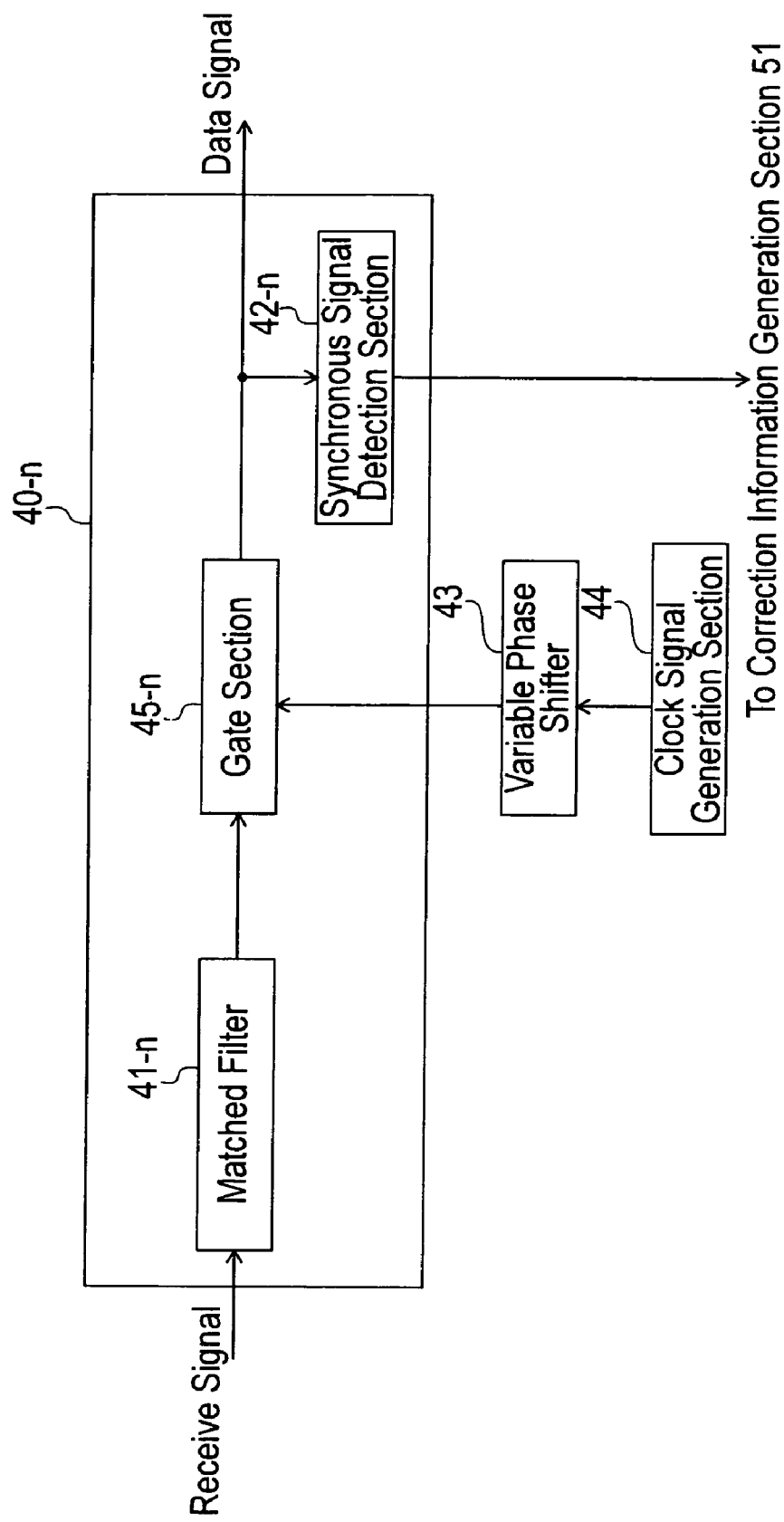
FIG. 4 is a block diagram depicting the receive section of the optical line terminal.

Now the configuration of the receive section 40 will be described with reference to FIG. 4. FIG. 4 is a block diagram depicting the receive section 40 of the optical line terminal 2. The receive section 40 has a matched filter 41, gate section 45 and synchronous signal detection section 42. The matched filter 41 decodes the code division multiplexed signal, to generate the correlation output signal, and outputs it. The clock signal generation section 44 generates the master clock signal, and outputs it. The variable phase shifter 43 adjusts the phase of the master clock signal, and outputs it.

The gate section 45 latches the correlation output signal, which is output from the matched filter 41 by the master clock signal, which is output after the phase thereof is adjusted by the variable phase shifter 43. The synchronous signal detection section 42 detects the synchronous signal from the signal which is output from the gate section 45.

Figure 5:
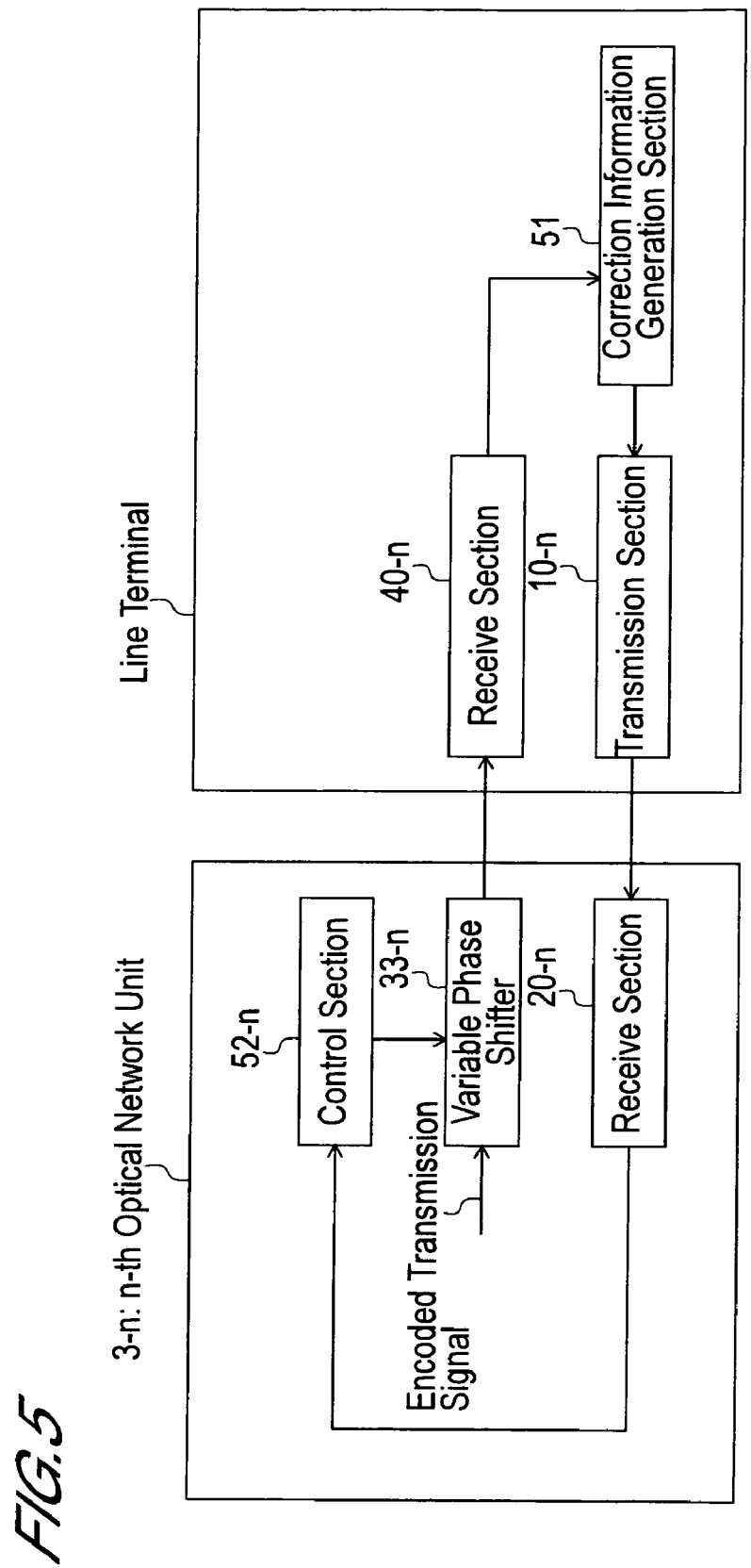
FIG. 5 is a block diagram depicting the access network system for explaining ranging.

The control system, which plays a central part in executing ranging, will now be described with reference to FIG. 5. FIG. 5 is a block diagram depicting the access network system for explaining ranging. In FIG. 5, only the functional portion for adjusting the receive timing required for ranging is extracted and systematically shown. In other words, the variable phase shifter 33, receive section 20 and control section 52 are shown for the optical network unit 3. For the optical line terminal 2, the receive section 40, transmission section 10 and correction information generation section 51 are shown.

The optical line terminal 2 has the correction information generation section 51 for generating and outputting correction information of the transmission timing to the optical network unit 3, and the correction information which is output from the correction information generation section 51 is input to the transmission section 10 of the optical line terminal 2, and is sent from the transmission section 10 to the receive section 20 of the optical network unit 3.

The transmission timing correction information extracted in the receive section 20 of the optical network unit 3 is input to the control section 52, the control section 52 computes the phase delay amount notified by this transmission timing correction information, and instructs the variable phase shifter 33 to add this phase delay amount of phase delay to the encoded transmission signal. This encoded transmission signal is a transmission signal to be sent from the optical network unit 3 to the optical line terminal 2.

The encoded transmission signal of which receive timing has been adjusted by the variable phase shifter 33 of the optical network unit 3 is input to the receive section 40 of the optical line terminal 2. When the encoded transmission signal is input to the receive section 40, a signal which reflects the synchronous signal detection result is generated by the synchronous signal detection section 42 of the receive section 40 (see FIG. 4, illustration is omitted in FIG. 5). This signal, which reflects the synchronous signal detection result, is input to the correction information generation section 51 of the optical line terminal, and completes the feedback loop.

<Normal Communication Operation>

The normal receive operation will be described first before describing the ranging method. Here it is assumed that ranging has already been completed, and the receive timing between the optical line terminal 2 and the optical network unit 3 has been adjusted.

First the transmission from the optical line terminal 2 to the optical network unit 3 (may also be called "down communication") will be described. In the down transmission, the synchronous signal is assigned to the data signal to be sent, then the data signal along with the synchronous signal is encoded and converted into an encoded transmission signal. The synchronous signal is assigned by the synchronous signal assignment section 13, and encoding is performed by the encoding section 12. The encoded transmission signal, added in the addition section 11, is generated as a code division multiplexed signal, and is sent to the optical network unit 3. The diffusion code assigned to each channel is input to the encoding section 12. For example, the first diffusion code assigned to the first channel is input to the encoding section 12-1 of the first channel (see FIG. 1).

In the optical network unit 3, the code division multiplexed signal is received and the decoding processing is performed by the matched filter 21 (see FIG. 2). The decoding processing is a processing to perform inverse diffusion processing on the code division multiplexed signal using a code assigned to the local channel in advance, and to generate the correlation output signal for this code.

The correlation output signal is input to the clock signal regeneration section 24 (see FIG. 2), and the regenerated clock signal is generated and output. For the generation of this regenerated clock signal, a known method using a PLL (Phase Lock Loop) circuit, for example, can be used, although this is omitted in FIG. 2. The correlation output signal is latched by the above mentioned regenerated clock signal, and is generated and defined as the receive data.

Now the transmission from the optical network unit 3 to the optical line terminal 2 (may also be called "up communication") will be described. The up signal is split into N by the distributor 49 and the split signal is input to the receive section 40 of each channel (see FIG. 3). In the receive section 40, inverse diffusion processing is performed on the up signal (code division multiplexed signal) using the code assigned to the local channel, and the correlation output signal for the local channel is generated. In other words, in the receive section 40, decoding processing is performed on the up signal. This correlation output signal is latched by the master clock signal of which phase has been adjusted, and generated and defined as receive data.

Figure 6:
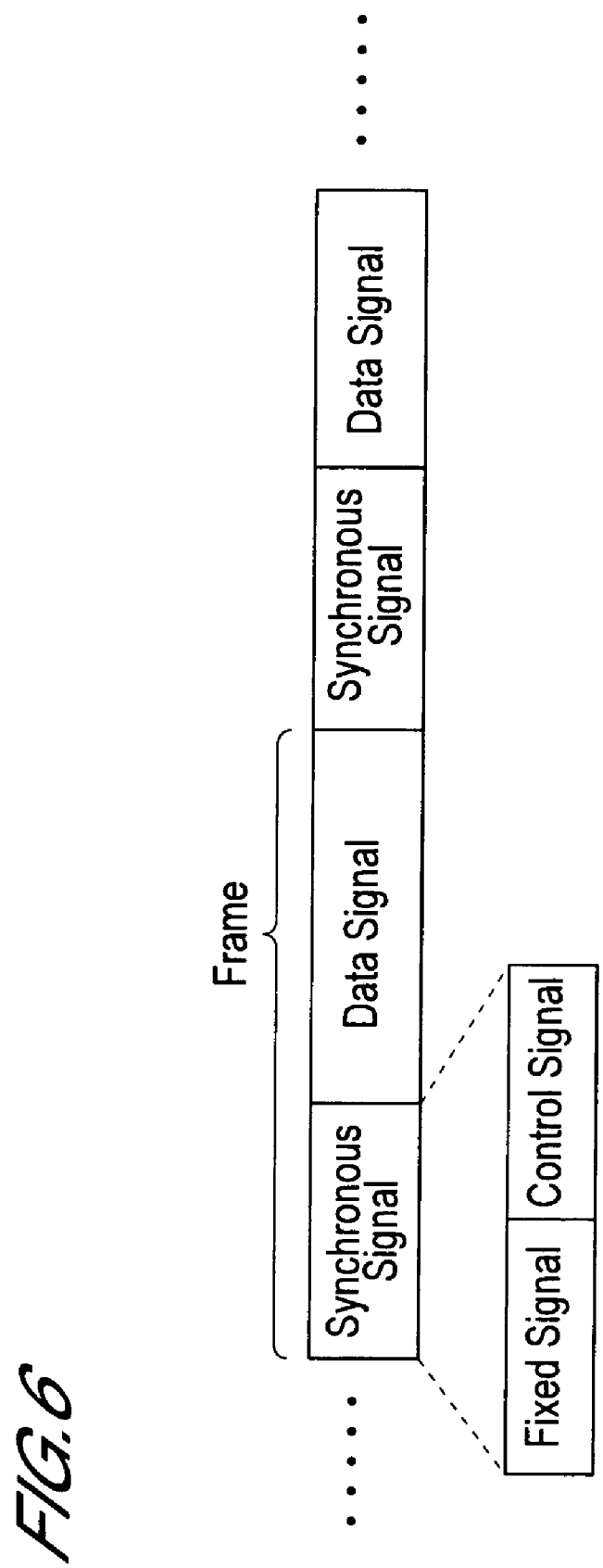
FIG. 6 is a diagram depicting the configuration of signals to be transmitted/received between the optical line terminal and the optical network units.

The format of the signal transmitted/received between the optical line terminal 2 and the optical network unit 3 will be described with reference to FIG. 6. FIG. 6 is a diagram depicting the configuration of the signal to be transmitted/received between the optical line terminal 2 and the optical network unit 3. One frame is comprised of a synchronous signal and a data signal, and this signal is comprised of frames which are repeated.

The synchronous signal is comprised of a fixed signal and a control signal. The fixed signal is a bit string having a predetermined pattern, and is used for the receive side to detect the first position of the frame or to perform later mentioned ranging.

The principle of encoding and decoding will now be described with reference to FIG. 7A to 7D. FIG. 7A shows a part (2 bits) of a waveform in the time domain of the transmission signal. FIG. 7B is a waveform in the time domain of the code (diffusion code) used for encoding or decoding the signal. FIG. 7C is a waveform in the time domain of the auto-correlation of the correlation output signal. FIG. 7D is a waveform in the time domain of the cross-correlation of the correlation output signal. In FIG. 7A to 7D, the abscissa is the time axis, and the ordinate is the signal intensity in an arbitrary scale respectively, although the actual ordinate line is not shown here.

The encoding and decoding are also called "diffusion modulation", and are processings for converting each bit constituting the digital signal to be sent into a bit pattern having an interval narrower than the bit interval thereof. The bit string constituting this bit pattern is a code, and a different code is assigned to each channel. The difference of codes means the difference of bit patterns. FIG. 7B shows an example of a code given by 16 bits of a bit string (1, 1, 0, 1, 0, 0, 0, 1, 1, 0, 1, 0, 0, 1, 0, 0).

Encoding means generating a product signal of the signal in FIG. 7A and the signal in FIG. 7B. To generate this product signal, the bias voltages of the signal in FIG. 7A and the signal in FIG. 7B are adjusted, and the center of the amplitude of these signals is set to 0 level, the signal format formed by two values "0" and "1" is converted into the signal format formed by two values "+1" and "−1", and the product of these signals is determined, for example. And in order to determine this product, an EXNOR (exclusive NOR) circuit, which is a gate circuit where an inverter is connected to the output of the EXOR (exclusive OR) gate, for example, is used. Certainly processing equivalent to the above processing can also be performed using other methods.

The correlation output signal shown in FIG. 7C and FIG. 7D is generated by determining (decoding) the product signal of an encoded signal which is encoded again and of a code the same as this code. In other words, the product signal of the code division multiplexed signal where encoded transmission signals are multiplexed, and the code signal, is determined. The encoded transmission signal component encoded with a code the same as the code used for decoding is decoded as an auto-correlation signal. The encoded transmission signal component encoded with a code different from the code used for decoding is generated as a cross-correlation signal.

FIG. 7C shows the waveform of the auto-correlation signal in the time domain, and FIG. 7D shows the waveform of the cross-correlation signal in the time domain. As FIG. 7C shows, in the waveform of the auto-correlation signal in the time domain, a strong positive/negative peak (hereafter may also be called "strong peak") appears with a 1 bit interval of the transmission signal. In FIG. 7C, the strong peak is indicated by a solid line arrow mark. This means that if threshold processing for extracting only these strong peaks is performed on the auto-correlation signal, a transmission signal can be acquired.

In the cross-correlation signal generated by decoding with a code different from the code used for generating the encoded transmission signal, the peaks seen in the case of the auto-correlation signal do not appear, as shown in FIG. 7D. Particularly when the encoded transmission signal is generated by performing diffusion modulation on the transmission signal using codes in the orthogonal code series, the cross-correlation signal becomes a silent status (status in signal intensity equivalent to 0 level) at a position on the time axis where a strong peak appears in the auto-correlation signal.

Therefore if the diffusion modulation is performed with a code in the orthogonal code series, the strong peak does not receive very much interference from the signal components of the other channels in the cross-correlation output signal generated by decoding the code division multiplexed signal acquired by multiplexing, so it is much easier and more certain to restore the transmission signal by threshold processing.

In the waveform of the auto-correlation signal in the time domain, not only the strong peaks but also a plurality of small peaks (hereafter may also be called "weak peak") appear. For the auto-correlation signal acquired by decoding the encoded transmission signal which is not multiplexed, the transmission signal can be extracted by performing threshold processing at a position on the time axis where this weak peak appears. However in the correlation signal acquired by decoding the code division multiplexed signal generated by multiplexing, the intensity of the weak peak becomes even weaker by the mutual interference of same types of weak peaks among a plurality of different channels, and the transmission signal cannot be extracted by performing threshold processing on the weak peak.

Therefore by executing ranging while simultaneously receiving the fixed signals which are sent from a plurality of optical network units, the weak peak of the auto-correlation signal acquired by decoding the receive signal is flattened and disappears by the cross-correlation signals of the receive signals from other optical network units which are simultaneously received, so the signal can be latched with certainty by the strong peak of the auto-correlation signal. Therefore the receive signal can always be decoded and received accurately.

The restored transmission signal includes the synchronous signal, as described in FIG. 6. In other words, the synchronous signal generated by decoding in the receive section 20 of the optical network unit 3 is input to the control section 52, and is used for the later mentioned ranging processing.

First Embodiment

Ranging means synchronizing the phases of the up signals from all the optical network units at the optical line terminal 2. Since the transmission distance from the optical line terminal 2 to each optical network unit is different, time from the transmission of each transmission signal from each optical network unit to the optical line terminal 2 to the transmission signal reaching the optical line terminal 2 has a difference. Ranging is a processing to adjust the phase of each transmission signal so that the optical line terminal 2 can synchronously receive each transmission signal, even if a time difference exists.

On the other hand, the optical line terminal 2 must also adjust the phase of the master clock signal for latching the correlation output signal which is generated by decoding the received signal. This is because the time width of the strong peak, extracted by performing the threshold processing for restoring the transmission signal, is narrower than the time interval of 1 bit of the transmission signal, as shown in FIG. 7C. In other words, the positional relationship of the correlation output signal and the master clock signal on the time axis must be adjusted so that the rise position of the master clock signal on the time axis exists within the time width of the strong peak. Adjusting the positional relationship of the correlation output signal and the master clock signal on the time axis corresponds to adjusting the phase of the master clock signal.

Here the processing for adjusting the phase of the master clock signal is also included in the ranging processing. In other words, the ranging is an operation for aligning and synchronizing the frequency of the up signals from all the optical network units 3 and the frequency of the master clock signal, and matching timing to latch the positions on the time axis where strong peaks of the correlation output signals of all the channels appear. The operation for matching timing to latch can be performed by adjusting the phase delay amount of the variable phase shifter 33, or the variable phase shifter 43. Since the position on the time axis where the strong peak of the correlation output signal appears and the timing to latch have a relative relationship, ranging must be performed with setting a phase of one signal as a reference.

The first example is a method for ranging using the phase of the master clock signal generated by the clock signal generation section 44 of the optical line terminal 2 as a reference (ranging method of the first invention). The later mentioned second example is a method for ranging using the phase of the up signal which is transmitted from an arbitrary optical network unit to the optical line terminal 2 as a reference (ranging method of the second invention). In the ranging method of the first invention, where the phase of the master clock signal generated by the clock signal generation section 44 is used as a reference, the phase delay amount to be set in the variable phase shifter 43 which adjusts the phase of the master clock signal and outputs it is fixed in all the steps of ranging.

Figure 8A:
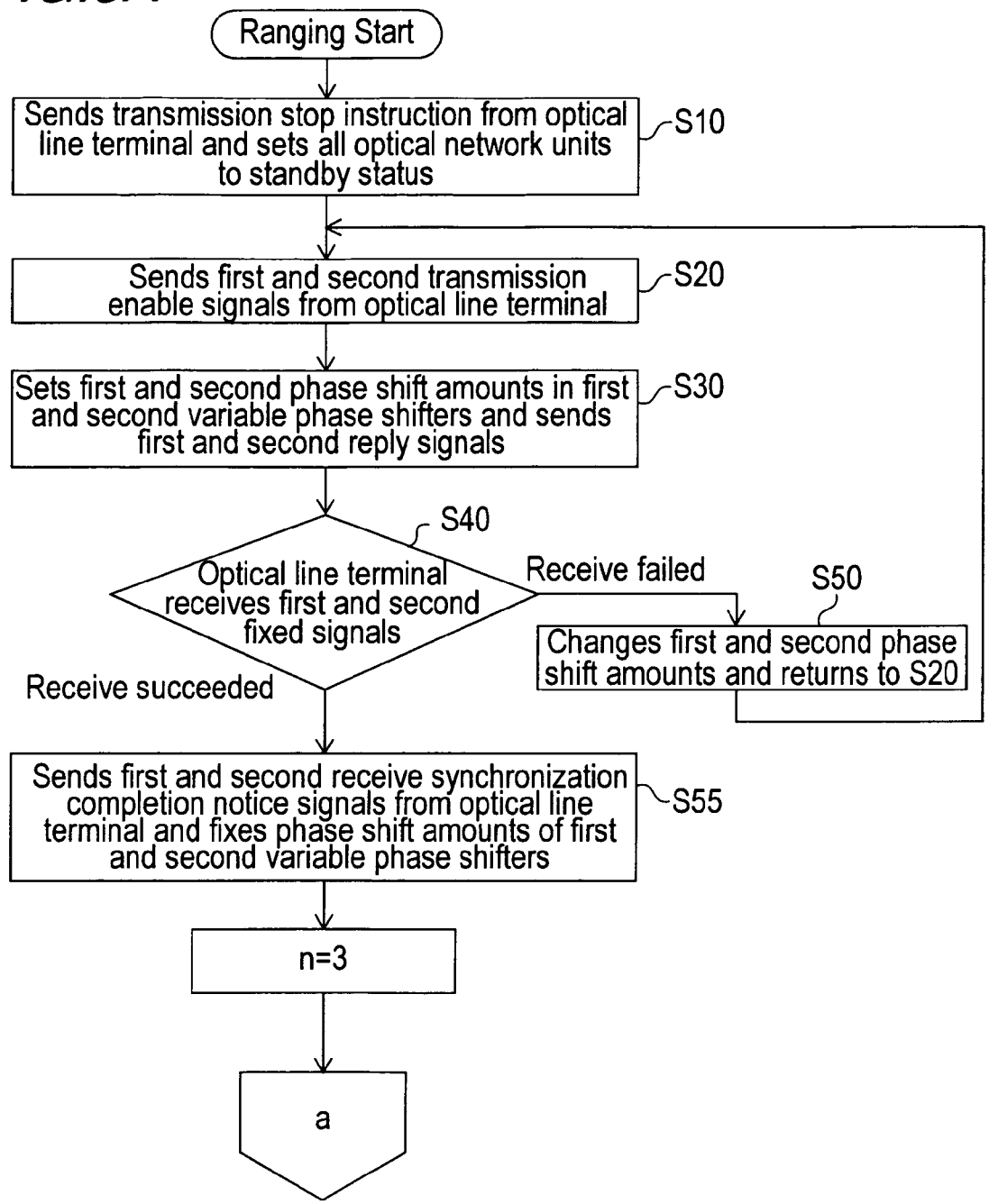
FIGS. 8A and 8B are flow charts depicting the ranging method of the first invention.
Figure 8B:
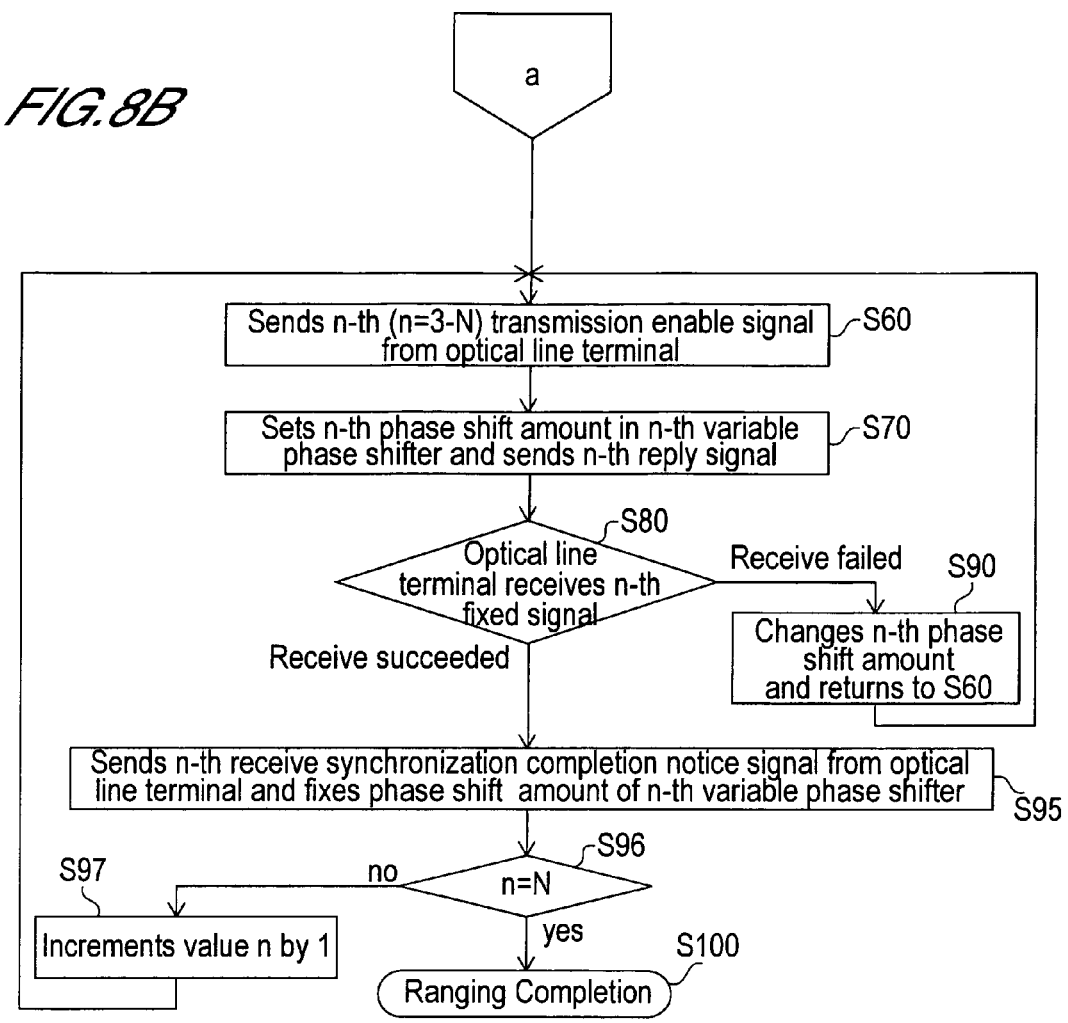

Now the ranging method of the first invention will be described with reference to FIG. 1 to FIGS. 8A and 8B. FIGS. 8A and 8B are flow charts depicting the ranging method of the first invention. FIG. 8A shows from the step of "RANGIN START" to the sixth step (In FIG. 8A, this is shown as n=3.). FIG. 8B shows from the s sixth step (S60) to the step S100. Since the ranging method of the first invention comprises the first to ninth steps, the processing contents will be described for each step sequentially from the first step.

To perform ranging, neither the up signal nor the down signal need include the data signal to be sent. Therefore in the transmission signal to be used in the ranging, one frame shown in FIG. 6 is comprised of only a synchronous signal which is further comprised of a fixed signal and a control signal.

Ranging is started when the power of the optical line terminal 2 is turned ON, or when the optical line terminal 2 detects a receive error of the up signal, for example. Ranging may be performed at a predetermined time interval by setting a timer device which sends a start instruction to start ranging to the optical line terminal 2.

The first step S10 is a step of sending the transmission stop instruction from the optical line terminal 2 to all the optical network units 3 respectively, and setting all the optical network units 3 to standby status. When the optical network unit 3 receives the transmission stop instruction, the optical network unit 3 can receive the down signal, but can no longer transmit the up signal. A concrete example of the signal of the transmission stop instruction will be described in the later mentioned description on "<Configuration of synchronous signal>".

In the ranging method of the first invention, ranging is executed sequentially from the first channel to the N-th channel. Ranging is performed simultaneously for the first channel and the second channel.

The second step S20 is a step of sending the first and second transmission enable signals from the optical line terminal 2 to the first optical network unit 3-1 and the second optical network unit 3-2 respectively. The first and second transmission enable signals are comprised of one or more synchronous signals respectively. In the control signal included in the synchronous signal, phase shift amount information, to instruct the phase shift amount to be set for the first variable phase shifter 33-1 and the second variable phase shifter 33-2, is stored. The phase shift amount to be set for the first variable phase shifter 33-1 and the second variable phase shifter 33-2 is one of the M types, that is $\{0, \Delta t, 2\Delta t, 3\Delta t, \ldots, (M-1)\Delta t\}$. The phase shift amount information has contents to instruct one of these M types of phase shift amount as the phase shift amount to be set. The specific method for setting the phase shift amount, which is instructed by the control signal included in the synchronous signal, will be described in the later mentioned description on "<Configuration of synchronous signal>" and "<Signal processing in optical network unit>".

There are M types of phase shift amount information to be sent to the first variable phase shifter 33-1 and the second variable phase shifter 33-2 respectively. So there are M×M combinations. Here M is a 2 or higher integer. This combination is, for example, the phase shift amount be set for the first variable phase shifter 33-1 is "0", and the phase shift amount to be set for the second variable phase shifter 33-2 is $\Delta t$.

$M \times \Delta t$ is equal to the 1 bit interval of the transmission signal. Therefore as long as the relationship of $M \times \Delta t = (1$ bit interval of the transmission signal) is satisfied, a plurality of combinations of the values M and $\Delta t$ may exist. If a large integer is selected as the value M, the minimum adjustment value $\Delta t$ of the phase shift amount can be small, so the phase shift amount to be set for the first and second variable phase shifters can be set with precision. However the time required for ranging is in proportion to M, so a longer time is required for ranging as the value M becomes larger.

If a small integer is selected for the value M, on the other hand, the minimum adjustment amount $\Delta t$ of the phase shift amount becomes large, so the phase shift amount to be set for the first and second variable phase shifters cannot be determined with precision. However the time required for ranging can be decreased. Therefore the manner in which M and $\Delta t$ are selected depends on design issues, such as the application format of the access network, including the transmission rate of the data signal, and the application environment including the average distance between an optical line terminal and an optical network unit.

In the third step S30, in the first optical network unit 3-1 and the second optical network unit 3-2, the first and second phase shift information, which are provided by the first and second control signals included in the first and second transmission enable signals are read respectively. Then the first and second phase shift amounts are set for the first variable phase shifter 33-1 and the second variable phase shifter 33-2 of the first optical network unit 3-1 and the second optical network unit 3-2 respectively. Finally the first and second reply signals are simultaneously sent from the first optical network unit 3-1 and the second optical network unit 3-2 to the optical line terminal 2 respectively. The first and second reply signals are comprised of one or more synchronous signals.

The fourth step S40 is a step of attempting simultaneous reception of the first and second fixed signals included in the first and second reply signals in the first receive section 40-1 and the second receive section 40-2 of the optical line terminal 2 corresponding to the first optical network unit 3-1 and the second optical network unit 3-2.

In the fourth step, the first and second reply signals are multiplexed and sent to the optical line terminal 2 as a code division multiplexed signal, in order to attempt simultaneous reception of the first and second fixed signals. Since the first and second reply signals are multiplexed and sent, it can be judged with certainty whether the fixed signals can be received or not.

For example, in the case of the first channel (channel assigned to the first terminal device 3-1), the weak peaks of the auto-correlation signal of the first channel of the correlation output signal which is generated by being decoded are flattened and disappear by the cross-correlation signal of the second channel which is received simultaneously, so threshold processing for the strong peaks can be performed with certainty. If the rise time of the regenerated clock signal for latching is included in the time width of the strong peak, in other words, if the delay time of the regenerated clock signal has been adjusted to the conditions for latching to be performed, the strong peak signal of the auto-correlation signal can be latched with certainty. Therefore judgment on whether the delay time of the regenerated clock signal has been adjusted to the conditions for latching to be performed, that is whether the fixed signal can be received or not, can be made with certainty. This judgment can be executed by confirming whether the bit pattern constituting the fixed signal is regenerated. If the delay time is not set to the conditions for latching to be performed, this bit pattern is not regenerated.

The fifth step includes the steps indicated as S50 and S55 in FIG. 8. In the fifth steps S50 and S55, processing is performed depending on whether the first and second fixed signals was received or not in the above mentioned fourth step. The reception of the first and second fixed signals is judged in step S40. If the first and second fixed signals were not received, processing advances to step S50, and if the first and second fixed signals were received, processing advances to step S55.

Step S50 is a step of sending an instruction from the optical line terminal to one or both of the first and second optical network units to set a phase shift amount different from the first and second phase shift amounts which were set in the third step. The instruction to be sent from the optical line terminal to one or both of the first and second optical network units at this time is the above mentioned transmission timing correction information. The transmission timing correction information is generated by the correction information generation section 51 of the optical line terminal 2, and is transmitted. By the execution of step S50, the second step to the fourth step are repeated until the first and second fixed signals are received.

Step S55 is a step of the optical line terminal 2 sending the first and second receive synchronization completion notice signals to the first optical network unit 3-1 and the second optical network unit 3-2 respectively, and defining and fixing the first and second phase shift amounts as the phase shift amounts of the first variable phase shifter 33-1 and the second variable phase shifter 33-2 respectively. By continuing to send the received first and second fixed signals from the optical line terminal 2 to the first optical network unit 3-1 and the second optical network unit 3-2, this fixed status is maintained.

At the point when the first and second fixed signals are received, processing advances to the sixth step. In FIG. 8, this is shown as n=3.

The sixth step S60 is a step of sending the n-th transmission enable signal from the optical line terminal 3 to the n-th (n is an integer in the 3 to N range) optical network unit 3-n. The closed loop from step S60 to the step S97 shown in FIG. 8 is repeated until the phase shift amounts of all the phase shifters of each optical network unit from the third optical network unit 3-3 to the N-th optical network unit 3-N are set, so that the delay time of the regenerated clock signal is set to the conditions for latching to be performed. Once the phase shift amount of the third variable phase shifter 33-3 of the transmission section 30-3 of the third optical network unit 3-3 is set to the conditions for latching to be performed, the value of n is incremented by 1, that is n=4, and the phase shift amount of the fourth variable phase shifter 33-4 of the transmission section 30-4 of the fourth optical network unit 3-4 is set to meet the conditions in which latching is possible, and this processing is repeated sequentially until n=N. This routing processing is performed by a known method.

The n-th (n=3 to N) processing in the closed loop of step S60 to step S97 shown in FIG. 8 is a step having a same contents as the above mentioned second step S20 to the fifth step S50, which are executed for the third optical network unit 3-3.

The n-th transmission enable signal is comprised of one or more synchronous signals respectively. In the control signal included in the synchronous signal, the phase shift amount information for instructing the phase shift amount to be set in the n-th variable phase shifter 33-n is stored. The phase shift amount to be set in the n-th variable phase shifter 33-n is one of the M types, that is $\{0, \Delta t, 2\Delta t, 3\Delta t, \ldots, (M-1)\Delta t\}$, just like the case of the above mentioned second step. The phase shift amount information has contents to instruct one of the M types of phase shift amounts as the phase shift amount to be set.

In the seventh step S70, in the n-th optical network unit, the n-th phase shift amount information, provided by the n-th control signal included in the n-th transmission enable signal, is read. Then the n-th phase shift amount based on the n-th phase shift amount information is set for the n-th variable phase shifter of the n-th optical network unit. Finally, the step of sending the n-th reply signal to the optical line terminal is executed. The n-th reply signal is comprised of one or more synchronous signals.

The eighth step S80 is a step of attempting to receive the n-th fixed signal included in the n-th reply signal sent from the n-th optical network unit 3-n in the n-th receive section 40-n of the optical line terminal 2 corresponding to the n-th optical network unit 3-$n$. The contents of the eighth step S80 is the same as the above mentioned fourth step S40.

In the eighth step S80, in order to attempt simultaneous reception of the n-th fixed signal, the n-th reply signal is multiplexed with at least one reply signal of a channel of which ranging has already completed, and sent to the optical line terminal 2 as the code division multiplexed signal. Since the reply signal of a channel, of which ranging has been completed, and the n-th replay signal are multiplexed and sent, it can be judged with certainty whether the fixed signal can be received, which is the same as the case of the fourth step S40.

The ninth step includes the steps indicated as S90 and S95 in FIG. 8. In S90 and S95 of the ninth step, different processing is performed depending on whether the n-th fixed signal was received or not in the above mentioned eighth step S80. The reception of the n-th fixed signal is judged in step S80. If the n-th fixed signal was not received, processing advances to step S90, and if the n-th fixed signal was received, processing advances to step S95.

The ninth step is a step of returning to the sixth step S60 if the n-th fixed signal was not received in the eighth step S80, and sending an instruction from the optical line terminal 2 to the n-th optical network unit 3-$n$ to set a phase shift amount different from the n-th phase shift amount which was set in the seventh step S70, or a step of sending the n-th receive synchronization completion notice signal from the optical line terminal 2 to the n-th optical network unit 3-$n$ if the n-th fixed signal was received, and defining and fixing the n-th phase shift amount as the n-th phase shift amount of the n-th variable phase shifter 33-$n$ of the transmission section 30 of the n-th optical network unit 3-$n$. The contents of the ninth step is the same as the above mentioned fifth step S50.

The first to the n-th fixed signals to be used for judging reception may be identical signals for all of the first to the n-th optical network units, or all different signals may be used as the fixed signals. The first to the n-th fixed signals are stored in storage devices (not illustrated) which are installed in the optical line terminal 2 and the optical network unit 3. And the patterns of the regenerated fixed signal and the fixed signal stored in the storage device are matched, and if there is a match, it is regarded that the fixed signal was received, for example. The pattern matching of the regenerated fixed signal and the fixed signal stored in the storage device can be implemented by a known method.

For another example, the fixed signal to be replied is indicated to the transmission enable signal in advance when the transmission enable signal is sent from the optical line terminal 2 to the optical network unit 3, and the patterns of the regenerated fixed signal and the fixed signal, which was indicated to the transmission enable signal as the fixed signal to be replied, are matched, and if there is a match, it is regarded that the fixed signal was received. This pattern matching can also be implemented by a known method. The method used depends on design issues.

Step S90 is a step of sending an instruction to set a phase shift amount different from the n-th phase shift amount which was set in the seventh step S70 from the optical line terminal 2 to the n-th optical network unit 3-$n$. By the execution of step S90, processing from the above mentioned sixth step S60 to the eighth step S80 is repeated until the n-th fixed signal is received.

Step S95 is a step of sending the n-th receive synchronization completion notice signal from the optical line terminal 2 to the n-th optical network unit 3-$n$ respectively, and defining and fixing the n-th phase shift amount as the phase shift amount of the n-th variable phase shifter 33-$n$ respectively. At the point when the n-th fixed signal is received, whether the value n is equal to N is judged in step S96, as shown in FIG. 8, and if they are not equal, processing advances to S97, where the value n is incremented by 1, and advances to step S60. If the value n is equal to N, processing advances to step S100, and ranging ends. The value n can be judged by a CPU using an ordinary method.

The sixth step to the ninth step are sequentially executed from the case of n=3 to n=N, while sending the i-th (i is an integer in the 1 to (n−1) range) reply signal from at least one i-th optical network unit out of the first to the (n−1)th optical network units to the optical line terminal. This is because, as described in the fourth step, it can be judged with certainty whether the fixed signal of a target channel can be received by attempting simultaneous reception of a plurality of fixed signals. In this way, it is characteristic of the present invention that ranging is always performed by multiplexing and sending a plurality of other fixed signals with the fixed signal of the target channel.

Second Embodiment

The ranging method of the second embodiment is the ranging method of the second invention, and is a ranging method for using the phase of the up signal, which is sent from an arbitrary optical network unit to the optical line terminal 2 as a reference, as mentioned above. Here the case when the phase of the up signal sent from the first optical network unit 3-1 to the optical line terminal 2, that is the up signal of the first channel, is used as the reference, will be described, but the phase of the up signal of any channel may be used as the reference.

In the ranging method of the second invention, the phase of the transmission signal transmitted from the first optical network unit 3-1 is used as the reference, so the phase delay amount, which is set for the first variable phase shifter 23-1 for adjusting the phase of the regenerated clock signal regenerated by the first clock signal generation section 24-1, is fixed in all the steps of the ranging.

Figure 9A:
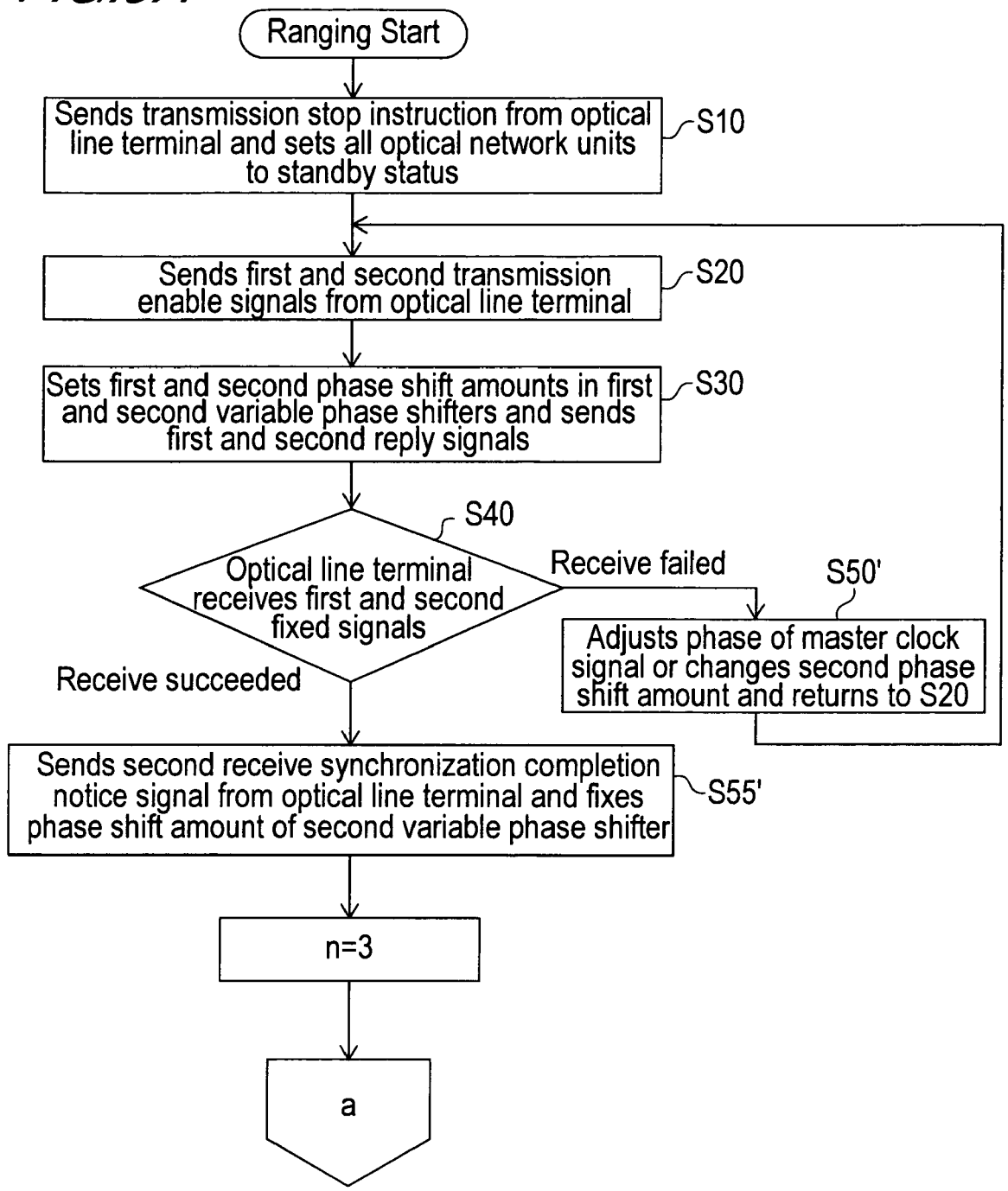
FIGS. 9A and 9B are flow charts depicting the ranging method of the second invention.
Figure 9B:
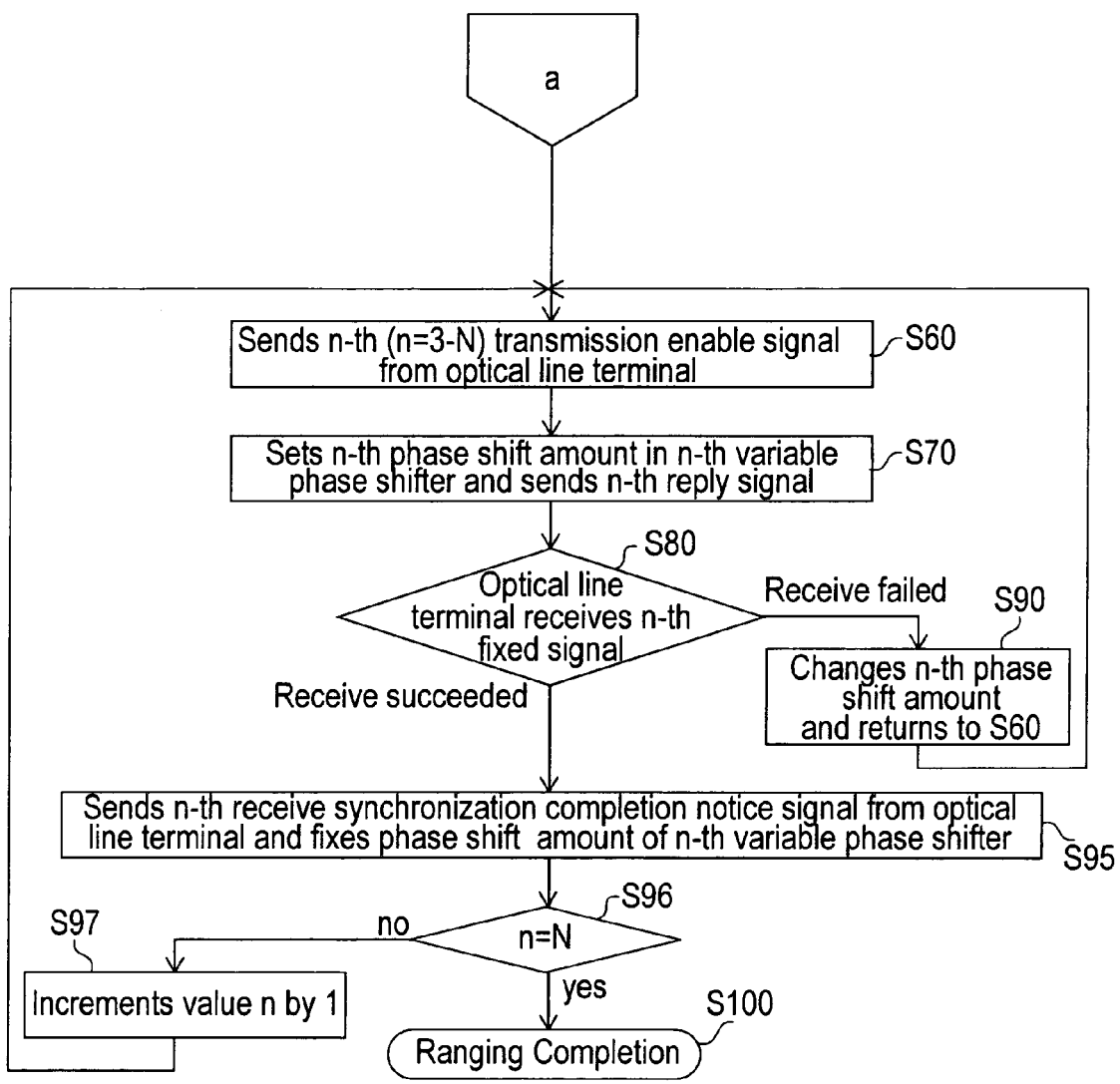

The ranging method of the second invention will be described with reference to FIGS. 9A and 9B. FIGS. 9A and 9B are flow charts depicting the ranging method of the second invention. FIG. 9A shows from the step of "RANGIN START" to the sixth step (In FIG. 9A, this is shown as n=3.). FIG. 9B shows from the sixth step (S60) to the step S100. The only difference of the ranging method of the second invention from the above described ranging method of the first invention is the fifth step, and the other steps are the same. Therefore the processing contents of the fifth step of the ranging method of the second invention will be described here, and the description of the other steps will be omitted.

The fifth step of the ranging method of the second invention includes the steps indicated as S50' and S55' in FIG. 9. In the fifth steps S50' and S55', different processing is performed depending on whether the first and second fixed signals were received or not in the fourth step S40. The reception of the first and second fixed signals is judged in step S40. If the first and second fixed signals were not received, processing advances to step S50', and if the first and second fixed signals were received, processing advances to step S55'.

Step S50' is a step of executing one or both operations, that is, changing the phase amount of the variable phase shifter 43 of the optical line terminal 2 for adjusting the phase of the master clock signal, and sending an instruction from the optical line terminal 2 to the second optical network unit 3-2 to set a phase shift amount different from the second phase shift amount which was set in the third step. By this step S50', the above mentioned loop from the second step S20 to the fourth step S40 is repeated until the first and second fixed signals are received.

The step S55' is a step of sending the second receive synchronization completion notice signal from the optical line terminal 2 to the second optical network unit 3-2, and defining and fixing the phase shift amount of the variable phase shifter 43 of the optical line terminal 2 and the second phase shift amount as the phase shift amount of the variable phase shifter 43 of the optical line terminal 2, and the phase shift amount of the second variable phase shifter 23-2 of the transmission section 20-2 of the second optical network unit 3-2. At the point when the first and second fixed signals are received, processing advances to the sixth step S60, which is the same as the ranging method of the first invention.

Figure 10A:
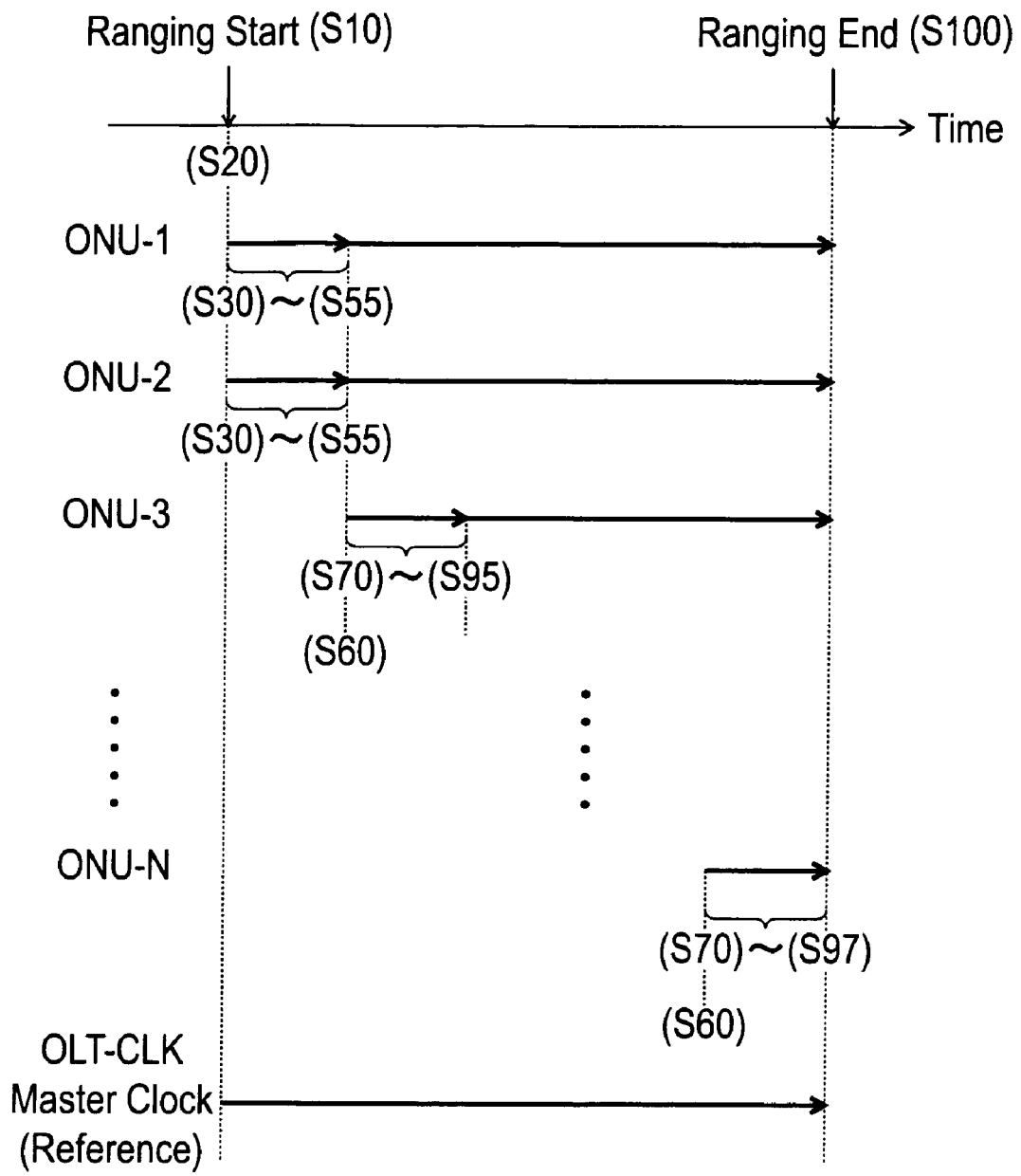
FIGS. 10A and 10B are diagrams depicting the operation status of the optical network unit 3 and the optical line terminal 2 from the start to end of the ranging according to the ranging methods of the first invention and the second invention respectively.
Figure 10B:
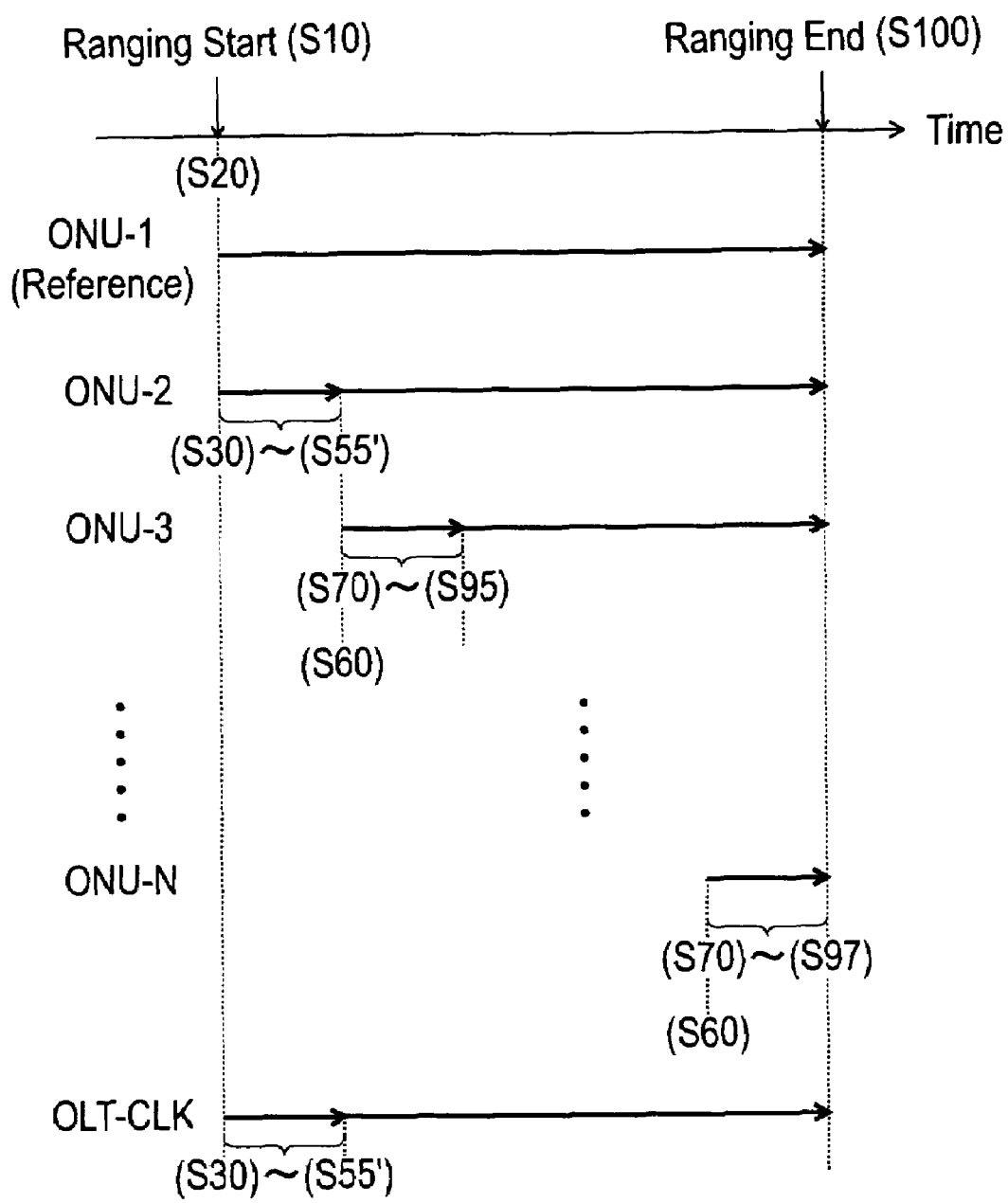

The difference of the ranging methods of the first invention and the second invention will be described comparing them with reference to FIGS. 10A and 10B. FIGS. 10A and 10B are diagrams depicting the operation status of the optical network unit 3 and the optical line terminal 2 from the start to end of the ranging according to the ranging methods of the first invention and the second invention respectively. In both diagrams, the status of the transmission signals of the first optical network unit (ONU-1) to the N-th optical network unit (ONU-N) and the master clock signal generated by the clock signal generation section 44 of the optical line terminal (OLT) are shown in parallel, sequentially from the top.

According to the ranging method of the first invention shown in FIG. 10A, ranging is performed using the fixed signals of ONU-1 and ONU-2 in the steps S30 to S55 after the ranging start (step S10) to step S20. At this time, the reference of the ranging is the phase of the master clock signal, so as shown at the very bottom in FIG. 10A, the phase of the master clock signal remains fixed. Even after the ranging of ONU-1 and ONU-2 ends, the fixed signals are continuously sent from ONU-1 and ONU-2 to OLT, because, as mentioned above, it can be judged whether the fixed signal of the target channel can be received with certainty by attempting simultaneous reception of a plurality of fixed signals.

After the ranging of ONU-1 and ONU-2 ends, the ranging of ONU-3 to ONU-N is executed. In FIG. 10A, after the ranging of ONU-1 and ONU-2 ends, the ranging using the fixed signal of ONU-3 is performed in step S70 to S95 via step S60. Also the ranging of ONU-4 to ONU-(N-1) is performed, although this is omitted in FIG. 10A, and the ranging of ONU-N is finally performed.

After the ranging of ONU-1 to ONU-(N-1) ends, fixed signals are continuously sent to OLT, but it is not necessary to continue sending the fixed signals from all of ONU-1 to ONU-(N-1) to OLT. It is sufficient if at least one of ONU-1 to ONU-(N-1) continues sending the fixed signals, so that OLT can receive a plurality of fixed signals simultaneously.

According to the ranging method of the second invention shown in FIG. 10B, ranging is performed using the fixed signals of ONU-1 and ONU-2 in steps S30 to S55' after the ranging start (step S10) to step S20. At this time, the reference of ranging is the phase of the fixed signal of ONU-1, so as shown at the very top in FIG. 10B, the phase of the fixed signal of ONU-1 remains fixed. Instead, the phase of the master clock signal is adjusted in steps S30 to S55'. Even after the ranging of ONU-1 and ONU-2 ends, the fixed signals are continuously sent from ONU-1 and ONU-2 to OLT, for the same reason as stated above.

After the ranging of ONU-2 ends, the ranging of ONU-3 to ONU-N is executed. In FIG. 10B, after the ranging of ONU-1 and ONU-2 ends, just like FIG. 10A, the ranging using the fixed signal of ONU-3 is performed in step S70 to S95 via step S60. Also the ranging of ONU-4 to ONU-(N-1) is performed, although this is omitted in FIG. 10B, and the ranging of ONU-N is finally performed.

After the ranging of ONU-1 to ONU-(N-1) ends, fixed signals are continuously sent to OLT, but it is not necessary to continue sending the fixed signals from all of ONU-1 to ONU-(N-1) to OLT, just like the case of the ranging method of the first invention. It is sufficient if at least one of ONU-1 to ONU-(N-1) continues sending fixed signals so that OLT can receive a plurality of fixed signals simultaneously.

<Configuration of Synchronous Signal>

In the above mentioned methods of this invention, a synchronous signal plays a central role. As mentioned above, the synchronous signal is comprised of a fixed signal and a control signal, and an example of the fixed signal and the control signal will be described in detail with reference to FIG. 11 and FIG. 12.

For the fixed signal sent from the optical network unit 3 to the optical line terminal 2 to be received, it is not sufficient that the frequency of the master clock signal and the frequency of the clock signal to be executed from the fixed signal match, and synchronization is not required so that the phases thereof must also be matched. This is because the positional relationship of the correlation output signal and the master clock signal on the time axis must be adjusted, so that the rise position of the master clock signal on the time axis exists in the time width of the strong peak, as described above with reference to FIG. 7C.

Figure 11:
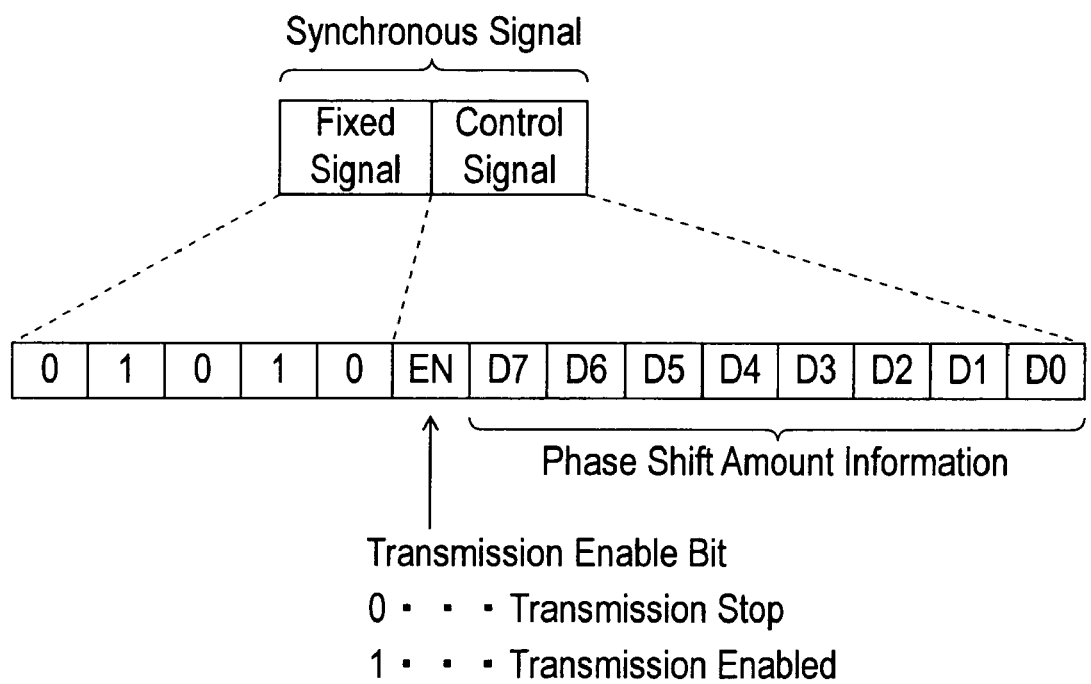
FIG. 11 is a diagram depicting the configuration of a synchronous signal.

FIG. 11 is a diagram depicting the configuration of the synchronous signal. Here, as an example of the fixed signal constituting the synchronous signal, a 5 bit signal (0, 1, 0, 1, 0) is shown. If the optical line terminal can reproduce the 5 bit signal, this means that the fixed signal was received.

The control signal, on the other hand, has a transmission enable bit (EN in the case of FIG. 11, hereafter may also be called "EN bit") for sending a transmission stop instruction or an instruction to enable transmission to the optical network unit 3. If the transmission enable bit is "0", it is a transmission stop instruction, and if "1", it is a transmission enable instruction, for example.

In the first step of the method of this invention, the transmission stop instruction is sent from the optical line terminal to all the first to N-th optical network units respectively, so as to set all the first to N-th optical network units to standby status, and this specifically means that the optical line terminal sends the synchronous signal of which EN bit of the control signal is "0". Also in the second step, the first and second transmission enable signals, which are sent to the first and second optical network units respectively, correspond to the transmission signals including a control signal of which EN bit is "1".

After this transmission enable bit, the control signal has phase shift amount information consisting of 8 bits, D7 to D0. For example, if the phase shift amount to be set for the variable phase shifter of the optical network unit is 0 ps (pico seconds), 8 bits from D7 to D0 (D7, D6, D5, D4, D3, D2, D1 and D0) are set to (0, 0, 0, 0, 0, 0, 0, 0). Hereafter 0 ps to 255 ps can be provided by 8 bits of binary values. In the case of 255 ps (pico seconds), (1, 1, 1, 1, 1, 1, 1, 1) is set.

Figure 12:
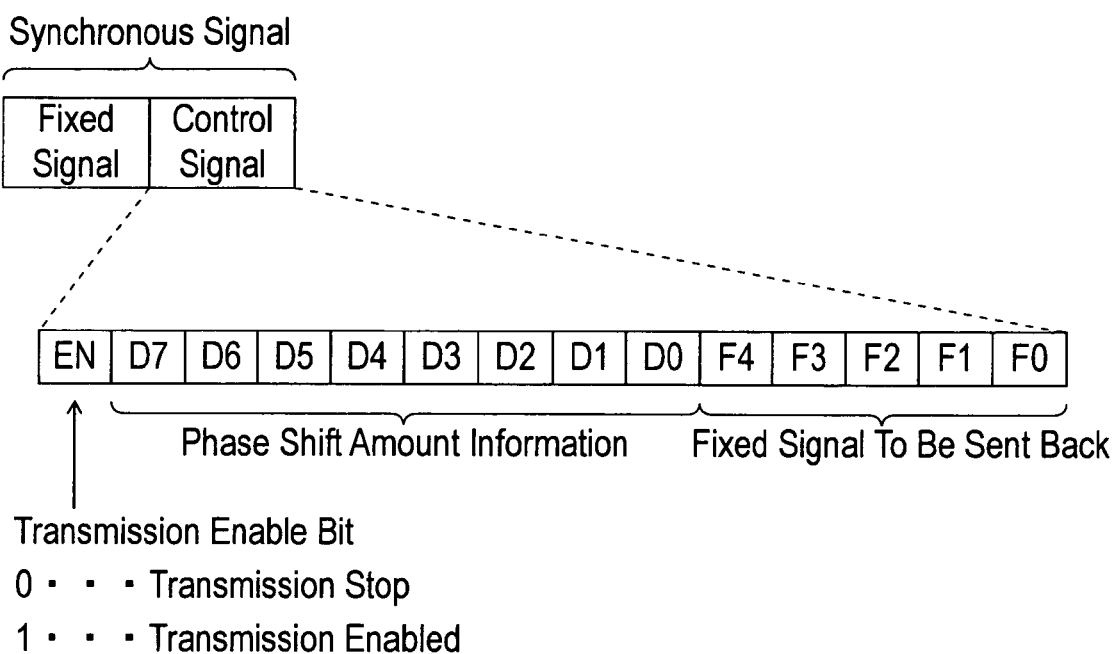
FIG. 12 is a diagram depicting an example of a synchronous signal for instructing the fixed signal to be sent back from the optical network unit to the optical line terminal.

FIG. 12 is a diagram depicting an example of the transmission enable signal (synchronous signal) to instruct the fixed signal to be sent back from the optical network unit 3 to the optical line terminal 2. In the second step of the method of this invention, the first and second fixed signals, which are sent from the optical line terminal 2 to the first and second optical network units (3-1 and 3-2), or the n-th fixed signal, which the optical line terminal 2 instructs the n-th optical network unit 3-n as the fixed signal to be sent back to the optical line terminal 2 in the seventh step, can be constructed by the 5 bit signal from F4 to F0 (F4, F3, F2, F1, F0), which comes after the 8 bit phase shift amount information signal from D7 to D0 in series, as shown in FIG. 12.

<Signal Processing in Optical Network Unit>

Figure 13:
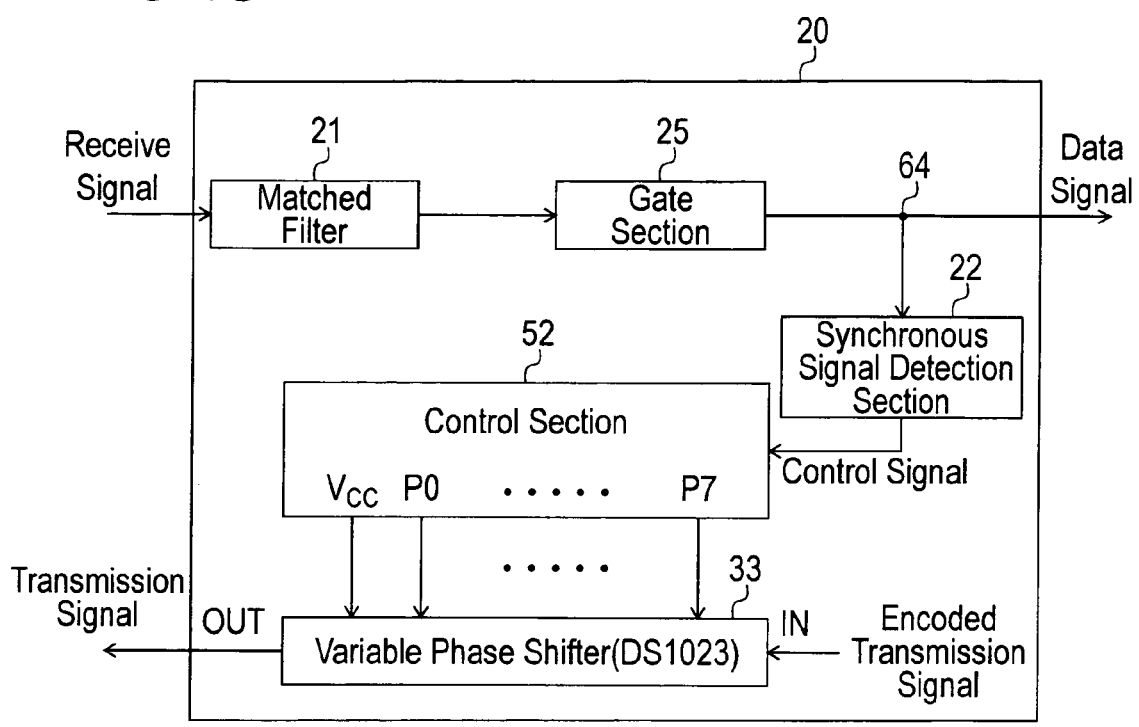
FIG. 13 is a diagram depicting the steps of signal processing in the optical network unit.

Steps from receiving the transmission enable signal from the optical line terminal 2 to sending the reply signal to the optical line terminal 2 in the optical network unit 3 will now be described with reference to FIG. 13. FIG. 13 is a block diagram depicting only a portion required for describing the signal processing step from receiving the transmission enable signal to sending the reply signal in the optical network unit 3. In the following description with reference to FIG. 13, it is not necessary to identify the channel to which the device belongs, so each composing element is denoted only with a main number.

The fixed signal which was sent from the optical line terminal 2 is generated and output as a correlation output signal by the matched filter 21, and the correlation output signal is latched by the master clock signal in the gate section 25, and is output. This output signal is split by the splitter 64, and input to the synchronous signal detection section 22, and the synchronous signal is detected.

The control signal included in this detected synchronous signal is a signal in which the information on transmission stop or transmission enable (indicated by the above mentioned EN bit) and the phase shift amount are represented by the digital data format, as shown in FIG. 11. The control signal is input to the control section 52, as shown in FIG. 13. Here the control signal means the transmission timing correction information extracted by the receive section 20 of the optical network unit 3, which was described when the configuration of the access network system, to which the method of this invention is applied, was described. The phase delay amount notified by this transmission timing correction information is calculated, and the variable phase shifter 33 is instructed to add the phase delay for this phase delay amount to the encoded transmission signal, and a specific example thereof is as follows.

For the variable phase shifter 33, DS1023 made by Maxim Co., for example, can be used. This variable phase shifter 33 has a function to add an arbitrary delay amount to the signal which is input from the input terminal (IN in FIG. 13), and output it from the output terminal (OUT in FIG. 13). The delay amount is controlled by the binary voltage signal which is output from the output terminal (P0, ..., P7) of the control section 52. The Vcc terminal of the control section 52 is a terminal for supplying power for operating the variable phase shifter 33. If power is not supplied from this Vcc terminal, no signal is output from the output terminal of the variable phase shifter 33.

If the EN bit of the control signal is "0" (transmission stop), transmission can be stopped by setting the voltage supply from the Vcc terminal to stop. If the EN bit is "1" (transmission enable), on the other hand, a signal is output from the output terminal of the variable phase shifter 33, which is transmission enable status, by setting the voltage to be supplied from the Vcc terminal. In order to set the phase shift amount for the variable phase shifter 33, the binary voltage signal, which is output from the output terminal (P0, ..., P7), is set, corresponding 1-to-1 with the 8 bits (D7, D6, D5, D4, D3, D2, D1, D0), which indicate the phase shift amount to be set for the variable phase shifter 33.

In the control signal included in the synchronous signal which is input and detected in the synchronous signal detection section 22, the phase shift amount information to indicate the phase shift amount to be set for the variable phase shifter 33 is contained. The phase shift amount to be set to 33-2 is one of the M types, that is $\{0, \Delta t, 2\Delta t, 3\Delta t, \ldots, (M-1)\Delta t\}$, and this control signal is output from the output terminal (P0, ..., P7) of the control section 52 as a binary digital voltage signal (8 bits in this case).

In order to set the value M large, the number of bits of the output terminal (P0, ..., P7) is increased. For example, the output terminal of the control section 52 is extended so that a 16 bit binary digital voltage signal can be handled. In this case, it is for certain necessary to use a variable phase shifter that can set the phase shift amount as a 16 bit binary digital voltage signal.

If the fixed signal was received, the control signal of which EN bit is "1" is sent from the optical line terminal, and a state where power is supplied from the Vcc terminal of the control section 52 to the variable phase shifter 33 is set. In this way, if the fixed signal was received, the fifth step of defining and fixing this phase shift amount, as the phase shift amount of the variable phase shifter 33 of the optical network unit 3, is executed.

What is claimed is:

1. A ranging method for an access network system in which a distributor/multiplexer for splitting one input signal into N(N is 2 or higher integer) and outputting the signals, or multiplexing N number of input signals into one signal and outputting the signal is installed at one end of a common transmission line, and 1 to N communication based on code division multiplexing is performed between an optical line terminal connected to the other end of said common transmission line and first to N-th optical network units connected respectively to N number of split transmission lines formed by being split by said distributor/multiplexer, the method comprising:
a first step of sending a transmission stop instruction from said optical line terminal to all of said first to N-th optical network units respectively so as to set all of said first to N-th optical network units to standby status;
a second step of sending a first and second transmission enable signals from said optical line terminal to said first and second optical network units respectively;
a third step of, in said first and second optical network units, reading first and second phase shift information provided by first and second control signals for said first and second optical network units included in said first and second transmission enable signals, setting first and second phase shift amounts according to said first and second phase shift information respectively in first and second variable phase shifters of said first and second optical network units respectively, and simultaneously sending first and second reply signals from said first and second optical network units to said optical line terminal respectively;
a fourth step of, in a first receive section and a second receive section of said optical line terminal corresponding to said first and second optical network units, attempting simultaneous receive of first and second fixed signals included in said first and second reply signals;
a fifth step in which if said first and second fixed signals cannot be received in said fourth step, processing returns to the second step and said optical line terminal sends an instruction to said first optical network unit and/or said second optical network unit to set a phase shift amount different from said first and second phase shift amounts which have been set in said third step, and if said first and second fixed signals can be received, said optical line terminal sends first and second receive synchronization completion notice signals to said first and second optical network units respectively, and said first and second phase shift amounts are defined and fixed as phase shift amounts of said first and second variable phase shifters of said first and second optical network units respectively;

a sixth step of, from said optical line terminal, sending an n-th (n is an integer in the 3 to N range) transmission enable signal to an n-th optical network unit;

a seventh step of, in said n-th optical network unit, reading said n-th phase shift information provided by an n-th control signal included in said n-th transmission enable signal, setting said n-th phase shift amount according to said n-th phase shift information for an n-th variable phase shifter of said n-th optical network unit, and sending a n-th reply signal to said optical line terminal;

an eighth step of, in an n-th receive section of said optical line terminal corresponding to said n-th optical network unit, attempting to receive an n-th fixed signal included in said n-th reply signal sent from said n-th optical network unit respectively; and a ninth step in which if said n-th fixed signal cannot be received in said eighth step, processing returns to said sixth step, and said optical line terminal sends an instruction to said n-th optical network unit to set a phase shift amount different from said n-th phase shift amount which has been set in said seventh step, and if said n-th fixed signal can be received, said optical line terminal sends an n-th receive synchronization completion notice signal to said n-th optical network unit, and said n-th phase shift amount is defined and fixed as said n-th phase shift amount of said n-th variable phase shifter of said n-th optical network unit, wherein from said sixth step to said ninth step, said optical line terminal receives an i-th reply signal (i is an integer in a 1 to (n−1) range and i≠n) which is sent from at least one i-th optical network unit out of said first to (n−1)th optical network units, executes processing sequentially from the case of n=3 to the case of n=N, and processing ends when said sixth step to said ninth step for n=N are executed.

2. A ranging method for an access network system in which a distributor/multiplexer for splitting one input signal into N(N is 2 or higher integer) and outputting the signals, or multiplexing N number of input signals into one signal and outputting the signals is installed at one end of a common transmission line, and 1 to N communication based on code division multiplexing is performed between an optical line terminal connected to the other end of said common transmission line and first to N-th optical network units connected respectively to N number of split transmission lines formed by being split by said distributor/multiplexer, the method comprising:

a fist step of sending a transmission stop instruction from said optical line terminal to all of said first to N-th optical network units respectively so as to set all of said first to N-th optical network units to standby status;

a second step of sending a first and second transmission enable signals from said optical line terminal to said first and second optical network units respectively;

a third step of, in said first and second optical network units, reading first and second phase shift information provided by first and second control signals for said first and second optical network units included in said first and second transmission enable signals, setting first and second phase shift amounts according to said first and second phase shift information respectively in first and second variable phase shifters of said first and second optical network units respectively, and simultaneously sending first and second reply signals from said first and second optical network units to said optical line terminal respectively;

a fourth step of, in a first receive section and a second receive section of said optical line terminal corresponding to said first and second optical network units, attempting simultaneous receive of first and second fixed signals included in said first and second reply signals;

a fifth step in which if said first and second fixed signals cannot be received in said fourth step, processing returns to said second step and either phase shift amount of said variable phase shifter of said optical line terminal for adjusting the phase of a master clock signal is changed and/or said optical line terminal sends an instruction to said second optical network unit to set a phase shift amount different from said second phase shift amount which has been set in said third step, and if said first and second fixed signals can be received, said optical line terminal sends a second receive synchronization completion notice signal to said second optical network unit and a phase shift amount of said variable phase shifter of said optical line terminal and said second phase shift amount are defined and fixed as said phase shift amount of said variable phase shifter of said optical line terminal and said phase shift amount of said second variable phase shifter of said second optical network unit respectively;

a sixth step of, from said optical line terminal, sending an n-th (n is an integer in a 3 to N range) transmission enable signal to an n-th optical network unit;

a seventh step of, in said n-th optical network unit, reading said n-th phase shift information provided by an n-th control signal included in said n-th transmission enable signal, setting said n-th phase shift amount according to said n-th phase shift information for an n-th variable phase shifter of said n-th optical network unit, and sending an n-th reply signal to said optical line terminal;

an eighth step of, in an n-th receive section of said optical line terminal corresponding to said n-th optical network unit, attempting to receive an n-th fixed signal included in said n-th reply signal sent from said n-th optical network unit respectively; and a ninth step in which if said n-th fixed signal cannot be received in said eighth step, processing returns to said sixth step, and said optical line terminal sends an instruction to said n-th optical network unit to set a phase shift amount different from said n-th phase shift amount which has been set in said seventh step, and if said n-th fixed signal can be received, said optical line terminal sends an n-th receive synchronization completion notice signal to said n-th optical network unit, and said n-th phase shift amount is defined and fixed as said n-th phase shift amount of said n-th variable phase shifter of said n-th optical network unit, wherein from said sixth step to said ninth step, said optical line terminal receives an i-th reply signal (i is an integer in a 1 to (n−1) range and i≠n) which is sent from at least one i-th optical network unit out of said first to (n−1)th optical network units, executes processing sequentially from the case of n=3 to the case of n=N, and processing ends when said sixth step to said ninth step for n=N are executed.

* * * * *